(12) United States Patent
Tomotaki et al.

(10) Patent No.: US 11,842,254 B2
(45) Date of Patent: Dec. 12, 2023

(54) OBJECT RECOGNITION BASED ON HIERARCHICAL DOMAIN-BASED MODELS

(71) Applicant: Verizon Patent and Licensing Inc., Basking Ridge, NJ (US)

(72) Inventors: Luis M. Tomotaki, Plano, TX (US); William F. Copeland, Garland, TX (US); Gina L. Otts, Flower Mound, TX (US); Saravanan Mallesan, Fairfax, VA (US); Natasha Avinash Shah, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 458 days.

(21) Appl. No.: 17/089,819

(22) Filed: Nov. 5, 2020

(65) Prior Publication Data

US 2021/0056340 A1   Feb. 25, 2021

Related U.S. Application Data

(63) Continuation of application No. 15/632,652, filed on Jun. 26, 2017, now Pat. No. 10,846,555.

(51) Int. Cl.
| | |
|---|---|
| *G06N 20/00* | (2019.01) |
| *G06T 7/00* | (2017.01) |
| *G06N 3/08* | (2023.01) |
| *G06N 20/20* | (2019.01) |
| *G06V 10/20* | (2022.01) |
| *G06V 20/40* | (2022.01) |
| *G06V 40/10* | (2022.01) |
| *G06F 18/21* | (2023.01) |
| *G06F 18/231* | (2023.01) |
| *G06V 10/762* | (2022.01) |

(Continued)

(52) U.S. Cl.
CPC ........... *G06N 20/00* (2019.01); *G06F 18/217* (2023.01); *G06F 18/231* (2023.01); *G06N 3/08* (2013.01); *G06N 20/20* (2019.01); *G06T 7/0002* (2013.01); *G06V 10/255* (2022.01); *G06V 10/7625* (2022.01); *G06V 10/776* (2022.01); *G06V 20/42* (2022.01); *G06V 40/103* (2022.01); *G06N 3/045* (2023.01)

(58) Field of Classification Search
None
See application file for complete search history.

(56) References Cited

U.S. PATENT DOCUMENTS

| 3,306,908 A1 | 11/2012 | Barker et al. |
| 2011/0320454 A1 | 12/2011 | Hill et al. |

(Continued)

OTHER PUBLICATIONS

Choi, et al., "Exploiting Hierarchical Context on a Large Database of Object Categories", IEEE, 2010, pp. 129-136 (Year: 2010).

(Continued)

*Primary Examiner* — Alan Chen

(57) ABSTRACT

A method, a device, and a non-transitory storage medium each provide an object recognition service that identifies an object within an image or a video. An object is identified according to a general classification based on a domain-based inference model, and is subsequently further identified according to a sub-classification of the general classification based on another domain-based inference model. The domain-based inference models are hierarchical. The object recognition of the object may be used in support of end user services.

20 Claims, 19 Drawing Sheets

(51) Int. Cl.
*G06V 10/776* (2022.01)
*G06N 3/045* (2023.01)

(56) References Cited

U.S. PATENT DOCUMENTS

| | | |
|---|---|---|
| 2013/0129143 A1 | 5/2013 | Chen et al. |
| 2015/0294370 A1 | 10/2015 | Nagarajayya |
| 2017/0083762 A1 | 3/2017 | Segalovitz et al. |
| 2018/0084309 A1 | 3/2018 | Katz et al. |
| 2018/0089543 A1 | 3/2018 | Merler et al. |

OTHER PUBLICATIONS

Vens, et al., "Decision trees for hierarchical multi-label classification", Mach Learn (2008) 73, pp. 185-214 (Year: 2008).

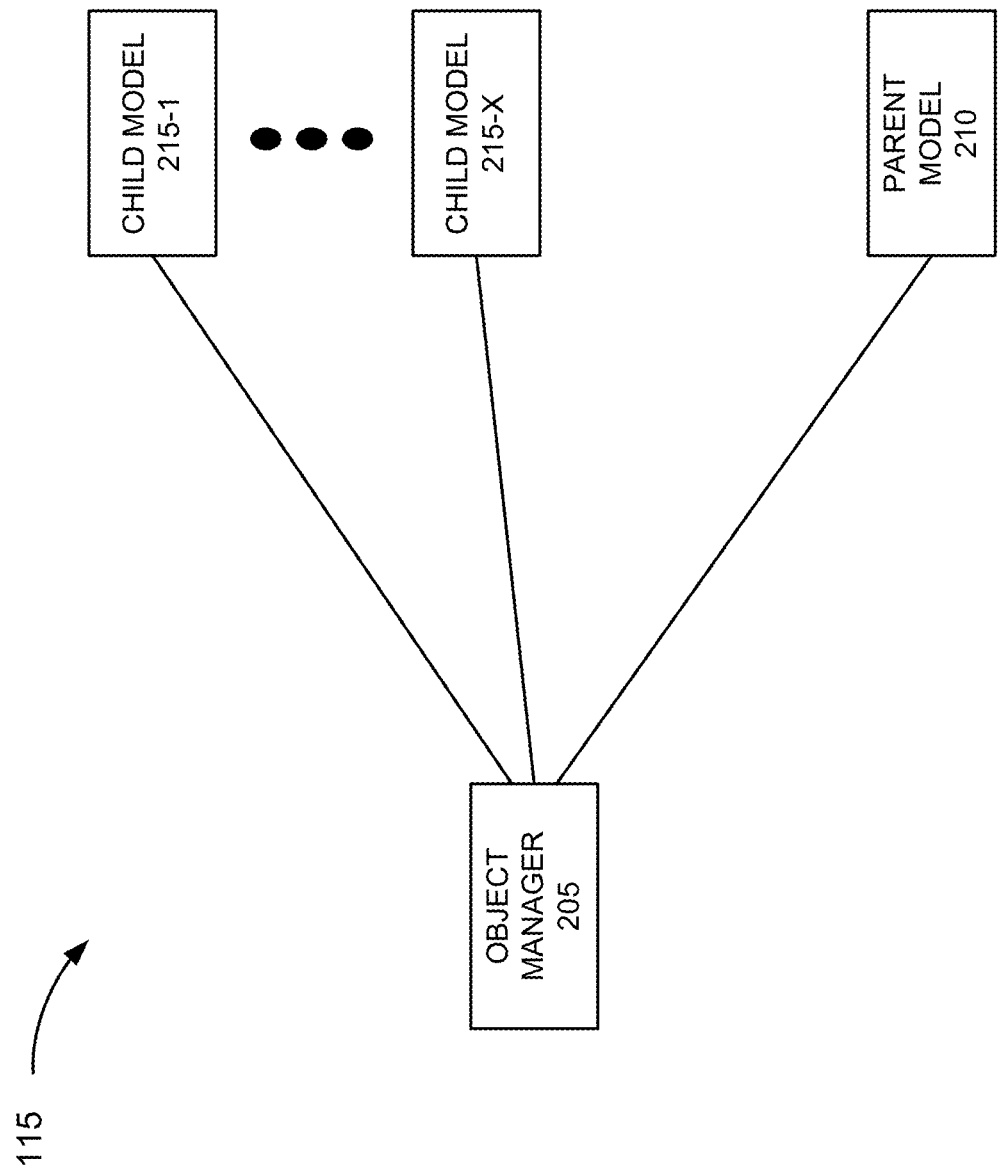

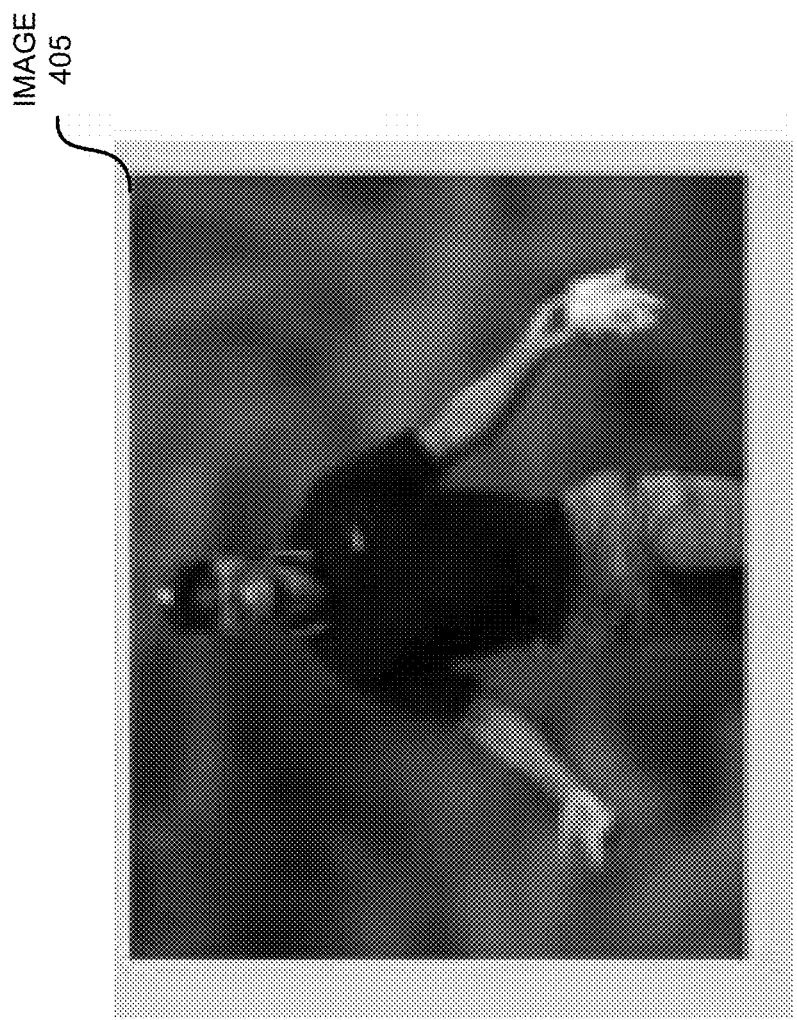
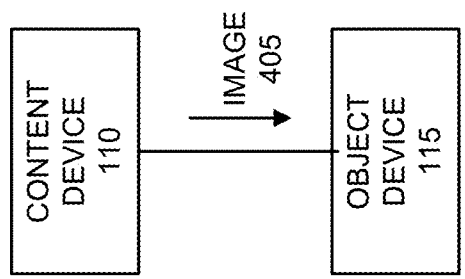
Fig. 4A

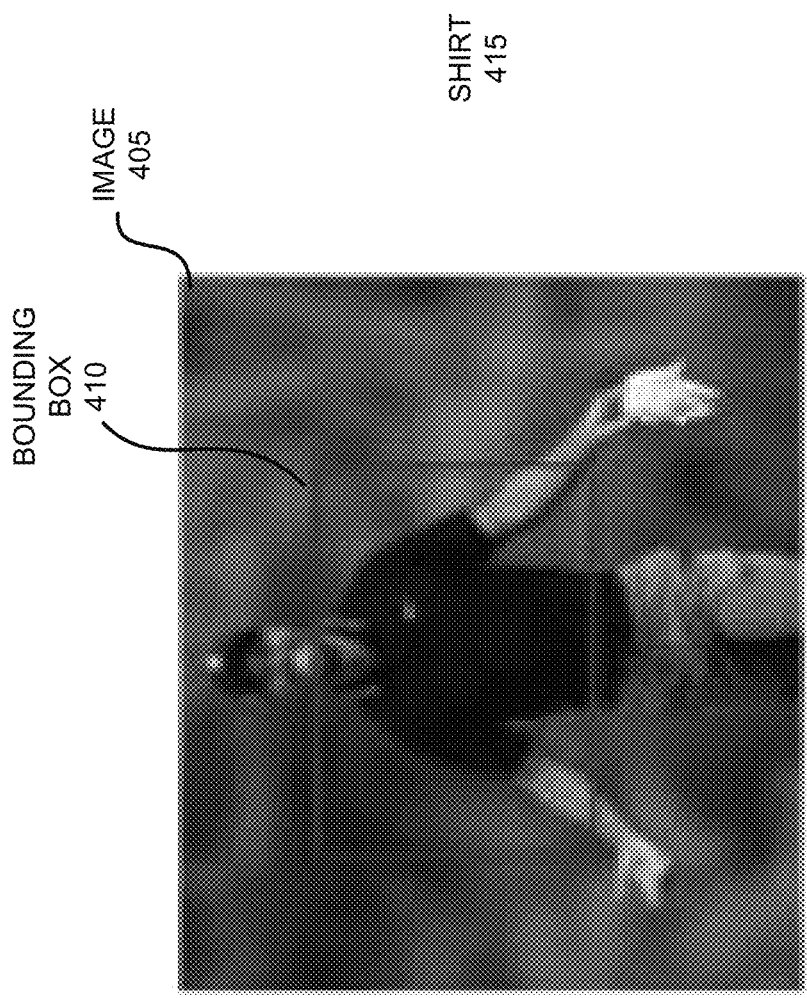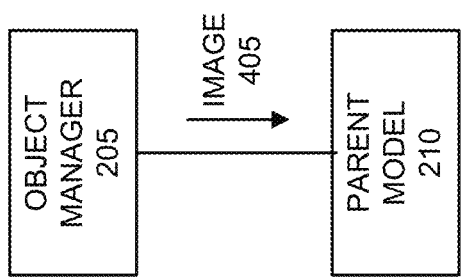
Fig. 4B

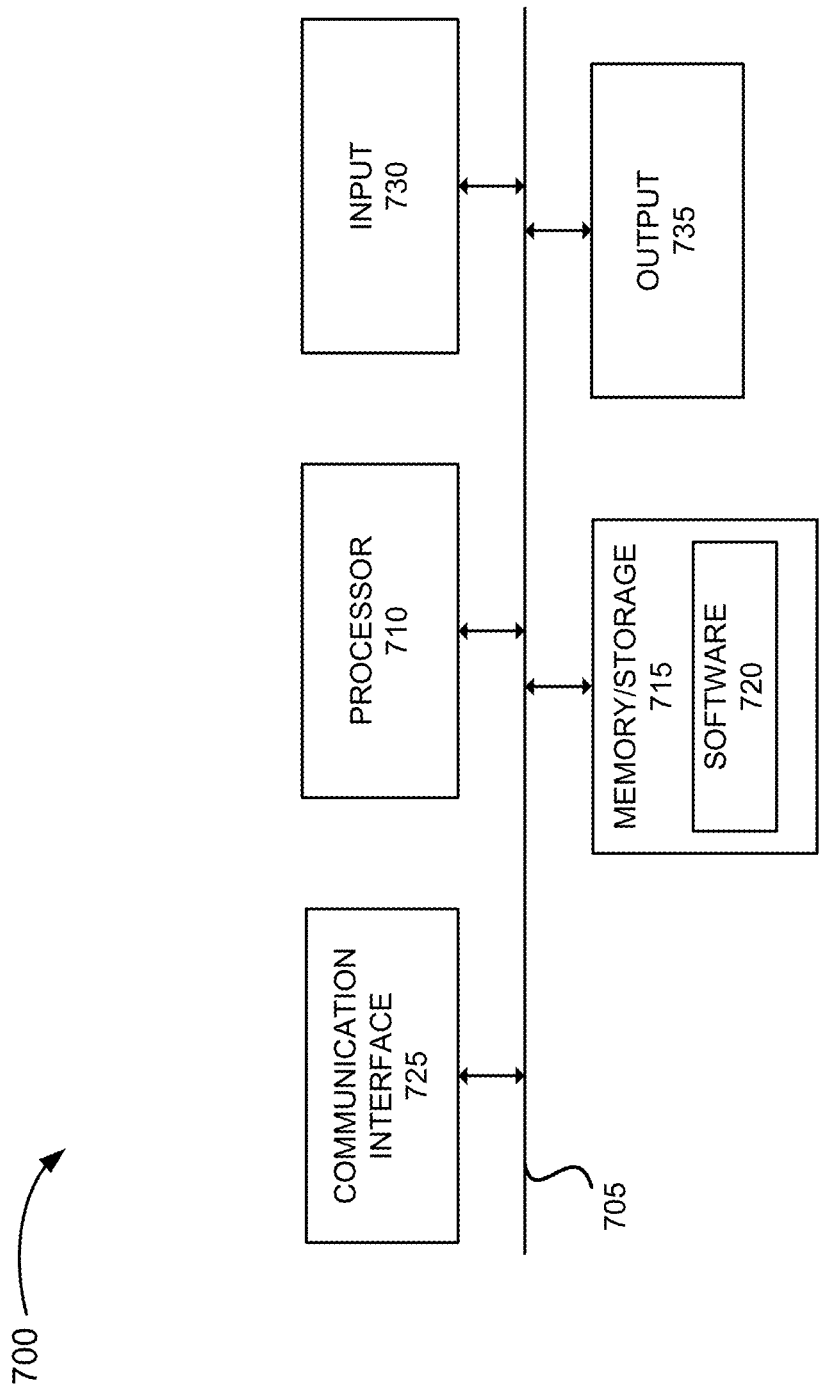

US 11,842,254 B2

OBJECT RECOGNITION BASED ON HIERARCHICAL DOMAIN-BASED MODELS

CROSS REFERENCE TO RELATED APPLICATION

This patent application claims priority to and is a continuation of U.S. patent application Ser. No. 15/632,652, entitled "OBJECT RECOGNITION BASED ON HIERARCHICAL DOMAIN-BASED MODELS" and filed on Jun. 26, 2017, the disclosure of which is incorporated herein by reference in its entirety.

BACKGROUND

Many machine-learning tasks are trained by a large amount of data using generic annotations that result in general classifications (e.g., dog, shirt, dress, etc.) of objects. As task requirements aim to a finer granularity of classification, machine learning systems that use annotation, training, and inference models, will be taxed to provide a same level of service.

BRIEF DESCRIPTION OF THE DRAWINGS

FIG. 2 is a diagram illustrating an exemplary embodiment of the object recognition system depicted in FIG. 1;

FIGS. 4A-4E are diagrams illustrating an exemplary process of the objection recognition service;

FIG. 7 is a diagram illustrating exemplary components of a device that may correspond to one or more of the devices illustrated herein;

DETAILED DESCRIPTION

Figure 1:
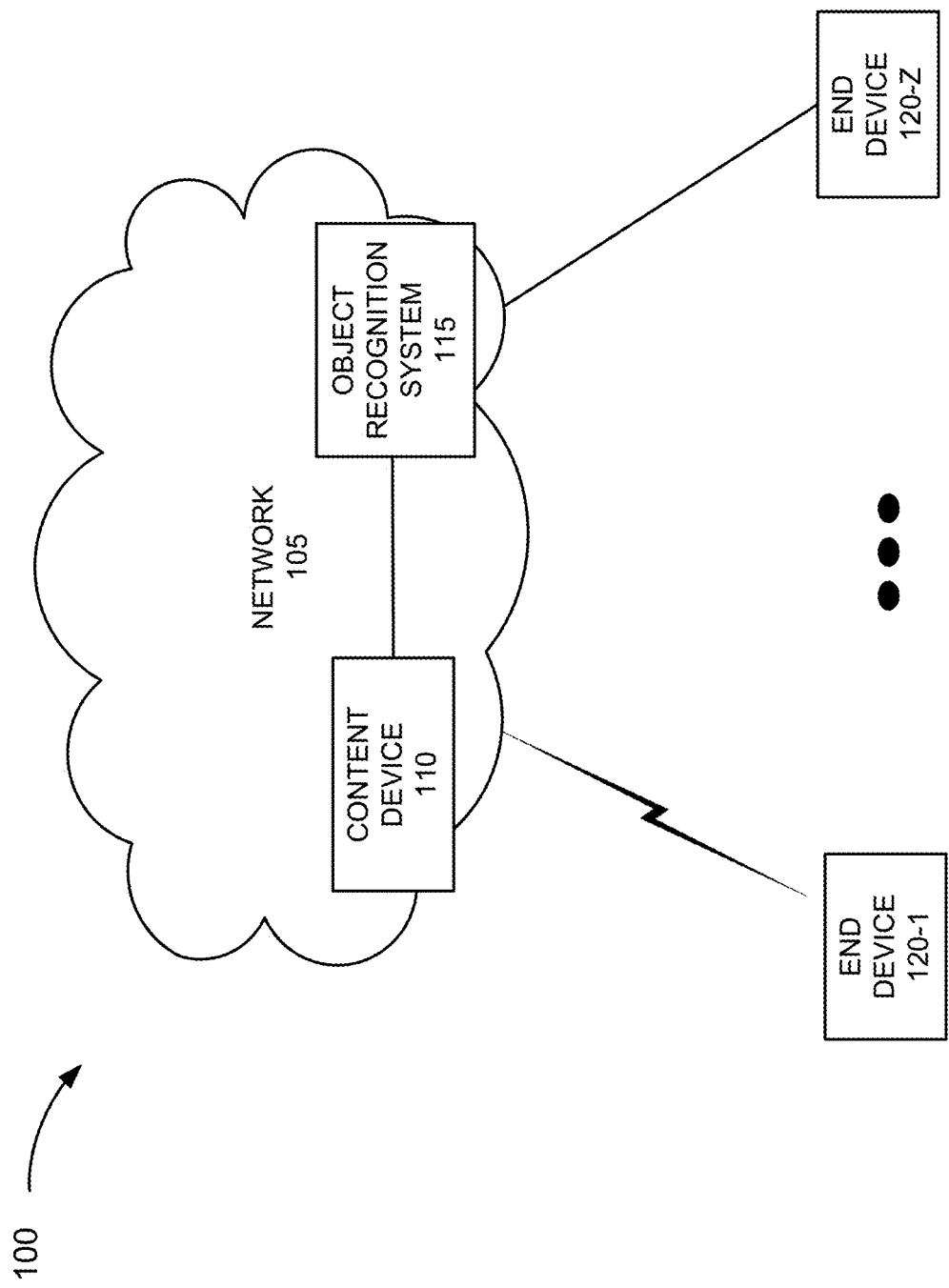
FIG. 1 is a diagram illustrating an exemplary environment in which an exemplary embodiment of an objection recognition service may be implemented.

The following detailed description refers to the accompanying drawings. The same reference numbers in different drawings may identify the same or similar elements. Also, the following detailed description does not limit the invention.

A machine-learning system may be trained by a large amount of data with generic annotations that result in only high-level classifications of objects. As tasks evolve, a more detailed sub-classification of objects will be sought that will require the machine learning system to accommodate the demands of such tasks. However, the raw datasets used to train a machine-learning task often require annotation and labeling of thousands of instances per classification in order to build a consistent ground truth. For example, in the case of image recognition, annotation includes the drawing of bounding boxes (e.g., using coordinates, such as X, Y, width, height, etc.) around all objects of interest, and adding a label to each bounding box. The annotation process is typically performed manually and can require an inordinate amount of human resources. Unfortunately, when expanding these object instances to sub-classifications, the time and effort for annotation is compounded.

Additionally, the size of the machine-learning system can increase dramatically, and the performance of the machine learning system can degrade significantly when the machine learning system has to recognize multiple general categories and correspondingly various sub-classifications within each general category. For example, a model that is able to classify general fashion items (e.g., shirts, dresses, hats, etc) may become too large, operate too slowly, and decrease in its accuracy of object recognition, when expanding the model to classify sub-classifications relating to shirts, dresses, hats, such as by manufacturer, color, specific type, etc.

Typically, an inference model of the machine-learning system can quickly detect and accurately recognize a large number of general classifications. However, with the introduction of sub-classifications, the ability to quickly detect and accurately recognize a large number of sub-classification may be lost. For example, the inference model may not be able to process instances, such as a shirt or a dress, which is included in an image, at the same rate as more detailed instances, such as a Nike Golf Polo shirt or a Versace V neck Cady Ruffle dress.

According to exemplary embodiments, an object recognition service that identifies an object is described. According to an exemplary embodiment, the service identifies an object within an image or a video (e.g., a sequence of images). According to an exemplary embodiment, the service processes tasks in a sequential manner. For example, the service identifies an object according to a general classification based on a domain-based inference model, and subsequently identifies the object according to a sub-classification of the general classification based on another domain-based inference model. According to an exemplary embodiment, the domain-based inference models are hierarchical.

According to another exemplary embodiment, the service processes tasks in a parallel manner. For example, the service identifies one or multiple objects according to one or multiple general classifications based on one or multiple domain-based inference models, and subsequently identifies the one or multiple objects to one or multiple sub-classifications based on multiple other domain-based inference models that are processed in parallel.

According to yet another exemplary embodiment, the service identifies an object according to a sub-classification without previous identification of a general classification of the object. According to still another exemplary embodiment, the service may normalize the results received from different inference models. According to the exemplary embodiment, the results are normalized based on a sliding window analysis of the images and a threshold object detection value, as described herein. According to further embodiments, the service annotates images for training. The phrase "machine learning" is intended to include various facets of technology, such as, for example, deep learning, neural networks, artificial intelligence, computer vision, among others not specifically mentioned, and may be implemented in many forms including, for example, supervised learning, unsupervised learning, reinforcement learning, convolutional neural networks, recurrent neural networks, and other well-known architectures and frameworks.

As a result, the service may more accurately and quickly detect and identify an object compared to existing methods. In this regard, the service may be used to support end user services that require object recognition of objects included in programs or the like. Also, the service may provide improved scalability based on the hierarchical domain-based model framework, as described herein, relative to existing methods. Additionally, the service is able to annotate images in a manner that reduces usage of human resources.

FIG. 1 is a diagram illustrating an exemplary environment 100 in which an exemplary embodiment of various services, as described herein, may be implemented. As illustrated, environment 100 includes a network 105. Network 105 includes a content device 110 and an object recognition system 115. As further illustrated, environment 100 includes end devices 120-1 through 120-X (also referred to collectively as end devices 120 and, individually or generally as end device 120).

Environment 100 includes communication links between network 105 and end devices 120, and between content device 110 and object recognition system 115. Environment 100 may be implemented to include wired, optical, and/or wireless communication links among the devices and the network illustrated. A communicative connection via a communication link may be direct or indirect. For example, an indirect communicative connection may involve an intermediary device and/or an intermediary network not illustrated in FIG. 1. The number and the arrangement of communication links illustrated in environment 100 are exemplary. Also, the number and the arrangement of devices and network illustrated in environment 100 are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

Network 105 includes one or multiple networks of one or multiple types. For example, network 105 may be implemented to include a terrestrial network, a wireless network, a wired network, and/or an optical network. By way of further example, network 105 may include a radio access network (RAN), a core network, a mobile network, a video streaming network, a television distribution network, the Internet, a public network, a private network, a cloud network, the World Wide Web, an Internet Protocol Multimedia Subsystem (IMS) network, a packet-switched network, a private network, a public network, a telecommunication network, a content delivery network, or some combination thereof.

Content device 110 includes a device that has computational and communication capabilities. For example, in a program or television distribution network context, content device 110 may be implemented as a super headend (SHE) device, a video hub office (VHO) device, a video serving office (VSO) device, an origin server, a web server, a file server, a video streaming server, or other type of network device that stores and/or distributes data (e.g., images, video, content, or other type of multimedia). According to an exemplary embodiment, content device 110 includes logic that provides data, which is subject to the service as described herein, to object recognition system 115. For example, content device 110 may provide various programs (e.g., television shows, sporting events, etc.) and/or channels (e.g., a sports channel, a fashion channel, etc.) that are included in a television service, to object recognition system 115. According to other examples, the data may be related to other types of content sources, services, and so forth. Content device 110 may also provide the data to end devices 120 as a part of a television service, an on-demand service, a streaming service, a file service, and so forth.

Object recognition system 115 includes a device that has computational and communication capabilities. According to an exemplary embodiment, object recognition system 115 includes logic that provides the services, as described herein. Object recognition system 115 includes an object detection algorithm and a classification algorithm. Object recognition system 115 includes a hierarchical domain-based inference model architecture. According to an exemplary implementation, a first hierarchy of the inference model provides a general classification of an object, and a second hierarchy of the inference model provides a sub-classification of the general classification of the object. Object recognition system 115 includes logic that can perform object recognition serially and in parallel, as described herein. Object recognition system 115 also includes logic that provides an annotation service and a normalization service, as described herein. Object recognition system 115 may be implemented to include one or multiple types of machine learning technologies and/or architectures, as described herein.

End device 120 includes a device that has computational and communication capabilities. End device 120 may be implemented as a mobile device, a portable device, or a stationary device. For example, end device 120 may be implemented as a smartphone, a personal digital assistant, a tablet, a netbook, a phablet, a wearable device, a set top box, an infotainment system in a vehicle, a smart television, a game system, a music playing system, or some other type of user device. According to various exemplary embodiments, end device 120 may be configured to execute various types of software (e.g., applications, programs, etc.). The number and the types of software may vary from one end device 120 to another end device 120. For example, end device 120 may include logic to receive and present video, images, television programs, movies, etc., via a web browser, service provider software, and so forth.

FIG. 2 is a diagram illustrating an exemplary embodiment of object recognition system 115. As illustrated, object recognition system 115 includes an object manager 205, a parent model 210, and child models 215-1 through 215-X (also referred to collectively as child models 215 and, individually or generally as child model 215). The number of devices illustrated is exemplary. For example, according to other exemplary embodiments, there may be multiple parent models 210. Additionally, or alternatively, object manager 205 may include parent model 210. Additionally, the number and the arrangement of links between the devices are exemplary. The links may be implemented as a hardware link (e.g., a bus, a shared memory space, etc.), a software link (e.g., inter-process communication), or a communication link in a network between devices (e.g., an optical line, a wired line, a wireless link). The use of the terms "parent" and "child" are exemplary nomenclature to denote the hierarchical relationship between models. In this regard, these labels are merely illustrative.

Object manager 205 includes logic that provides an object management service. For example, the object management service obtains data from content device 110, and coordinates the processing of data relative to parent model 210 and child models 215, as described herein. The object management service may also provide data stemming from the output of the object recognition service, to other network devices (not illustrated in FIG. 1). As an example, the object recognition service may be used as a basis to support various end user services associated with users (not illustrated in FIG. 1) of end devices 120. By way of further example, a shopping service may be provided to users in which objects presented to users during television shows or other programs may be selected by the users, purchased, queried for additional information pertaining to the objects, or subject to some other type of interactive service.

Parent model 210 includes logic that identifies one or multiple objects of a general category. For example, parent model 210 may identify an object of a general category within an image or a video. By way of further example, a general category may be a shirt, a dress, or other type of fashion item (e.g., a pocketbook, jewelry, etc.). Alternatively, the general category may pertain to non-clothing objects or things. Parent model 210 may include a machine learning algorithm configured for object detection and classification. Parent model 210 may be implemented to include one or multiple types of machine learning technologies and/or architectures, as described herein.

Child model 215 includes logic that identifies one or multiple objects at a sub-category relative to the general category of parent model 210. For example, child model 215 may identify an object of a sub category of the general category within an image or a video. By way of further example, the sub-category may be a particular type of shirt (e.g., a Nike Polo Shirt, an Armani shirt, etc), a particular dress (e.g., a Versace dress, etc), or other sub-classification of the general class of the object. Alternatively, the sub-category may pertain to non-clothing objects or things. Child model 215 may include a machine learning algorithm configured for object detection and classification. Child model 215 may be implemented to include one or multiple types of machine learning technologies and/or architectures, as described herein.

As previously described, according to an exemplary embodiment, the service includes an annotation service. The annotation service includes generating bounding boxes that identify the areas within which the objects are located. The annotation service also includes generating metadata that indicate the names of the objects. The output of the annotation service may be used as training data for child models 215 for identifying sub-classifications of a general category of an object.

Figure 3A:
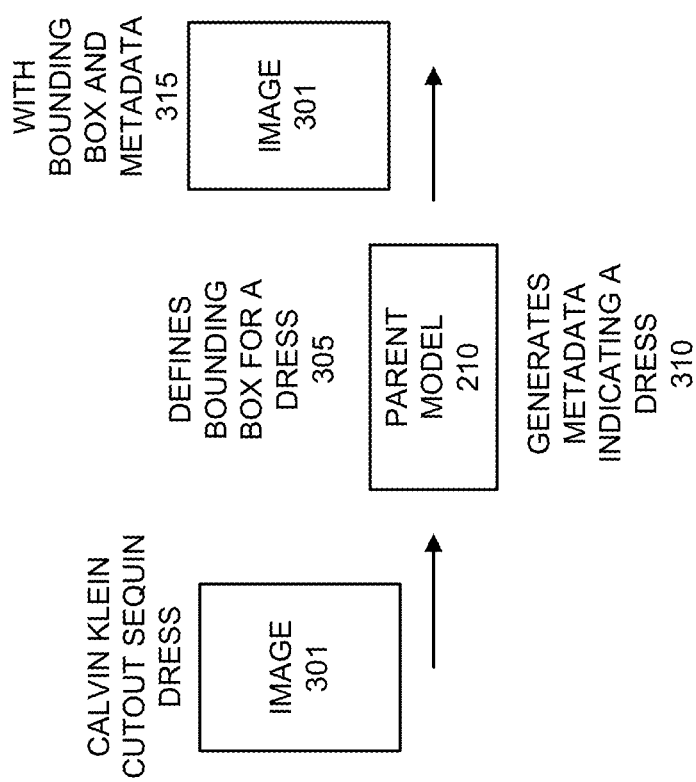
FIGS. 3A and 3B are diagrams illustrating an exemplary process of an annotation service.
Figure 3B:
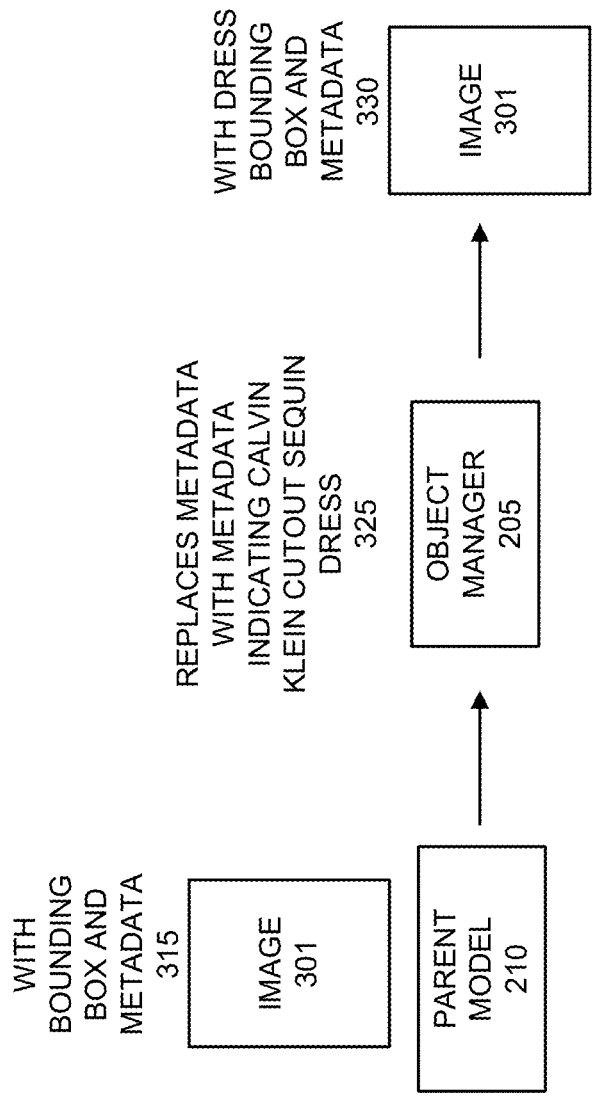

FIGS. 3A and 3B are diagrams illustrating an exemplary process of an exemplary embodiment of an annotation service included in the objection recognition service. Referring to FIG. 3A, assume that an image 301 is input into parent model 210, and image 301 includes an image of a sub-class of a general class of object. For example, image 301 is an image of a Calvin Klein cutout sequin dress. Also, assume that parent model 210 is configured for object recognition of a dress. As illustrated, parent model 210 defines a bounding box for a dress 305. For example, parent model 210 is able to auto-draw the bounding box around the dress included in image 301 based on generic classifiers. Additionally, parent model 210 generates metadata indicating that the recognized object is a dress 310. Parent model 210 may also output a confidence score.

Referring to FIG. 3B, object manager 205 obtains the output from parent model 210. Object manager 205 uses original data associated with image 301 to replace the metadata generated by parent model 210. For example, object manager 205 replaces the metadata (e.g., dress) with metadata indicating that the object is a Calvin Klein cutout sequin dress 325. As an example, image 301 may include metadata indicating that the object is a Calvin Klein cutout sequin dress. By way of further example, according to an exemplary scenario, an administrator may receive images, which depict various lines of clothing, from a particular clothing manufacturer or fashion warehouse. The images may each include metadata indicating the particular type of clothing depicted. Alternatively, the name of the image file may indicate the particular type of clothing.

Object manager 205 outputs the data that includes the bounding box and the replaced metadata. The output may be used as training data for training child model 215 for a sub-classification of a dress (e.g., a Calvin Klein cutout sequin dress). Object manager 205 may reformat the output into a format required for detecting the desired sub-classification. For example, object manager 205 may resize the bounding box coordinates, adjust the resolution of the image, and/or perform other modifications that are required to satisfy the input requirements of child model 215. As a result, the annotation service may build training data for child models 215, which are able to recognize sub-classes of objects, in a manner that minimizes the usage of human resources.

Figure 4C:
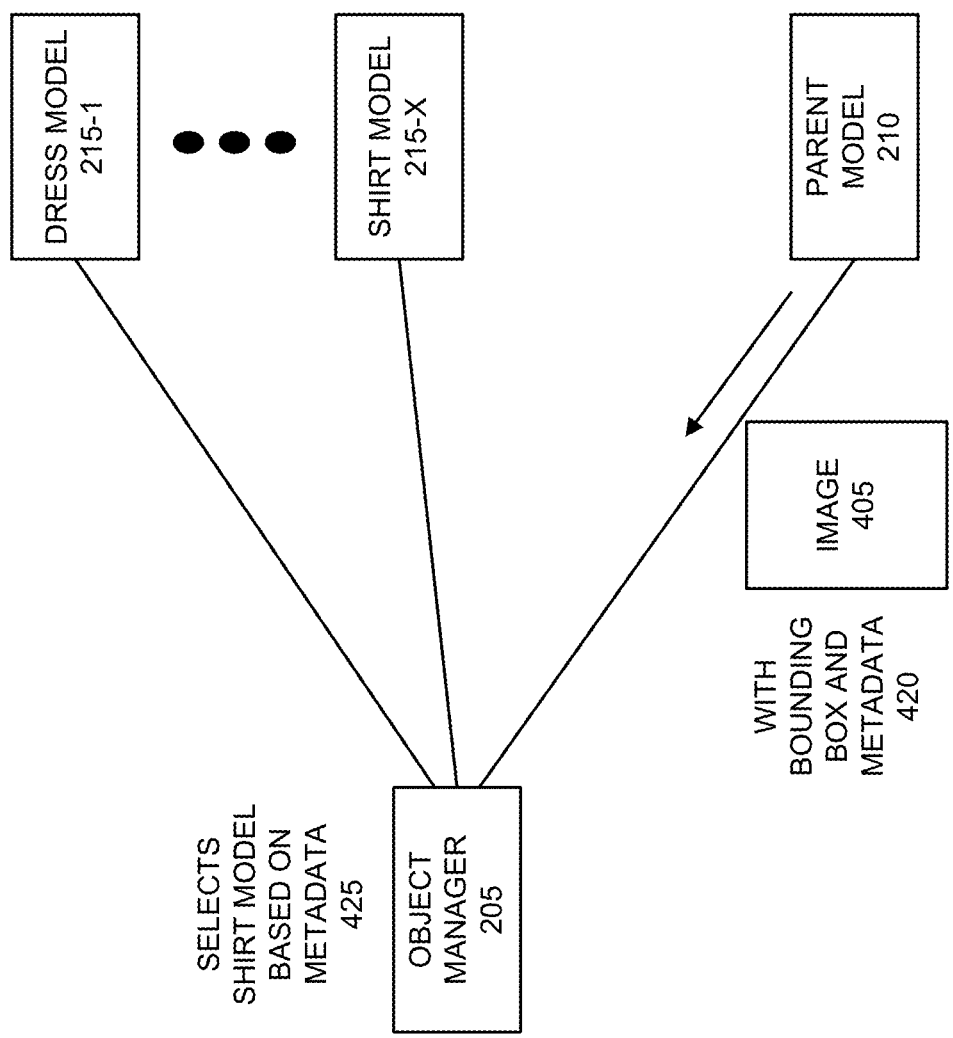

FIGS. 4A-4E are diagrams illustrating another exemplary process of an exemplary embodiment of the service. As previously described, the service includes an object recognition service that is based on hierarchical domain-based inference models. It may be assumed that parent model 210 and child models 215 have been trained. Referring to FIG. 4A, as illustrated, assume that object device 115 receives an image 405 from content device 110. Referring to FIG. 4B, object manager 205 passes image 405 to parent model 210. In response to receiving image 410, parent model 210 uses a bounding box 410 to analyze image 405, and determines that an object in image 405 is a shirt 415. Referring to FIG. 4C, in response to this determination, parent model 210 passes image 405 back to object manager 205. The communication between parent model 210 and object manager 205 may include other data, such as the coordinates of the bounding box, metadata indicating that the object is a shirt, and a confidence score.

In response to receiving the communication, object manager 205 selects one of the child models 215. In this example, child models 215 include a dress model 215-1 and a shirt model 215-X. Based on the data received from parent model 210, object manager 205 selects shirt model 215-X to further process image 405 and determine a sub-classification for the shirt.

Figure 4D:
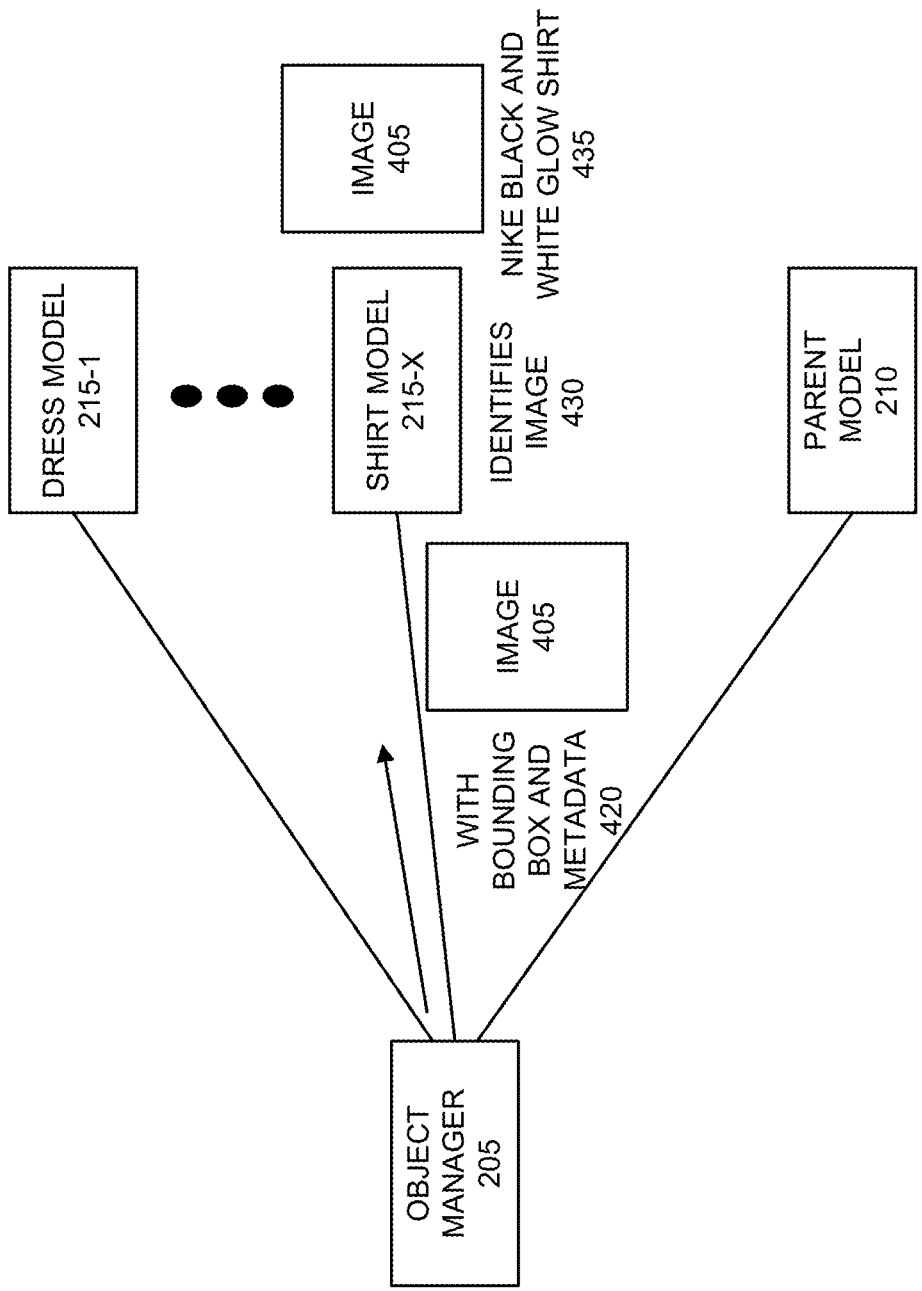
Figure 4E:
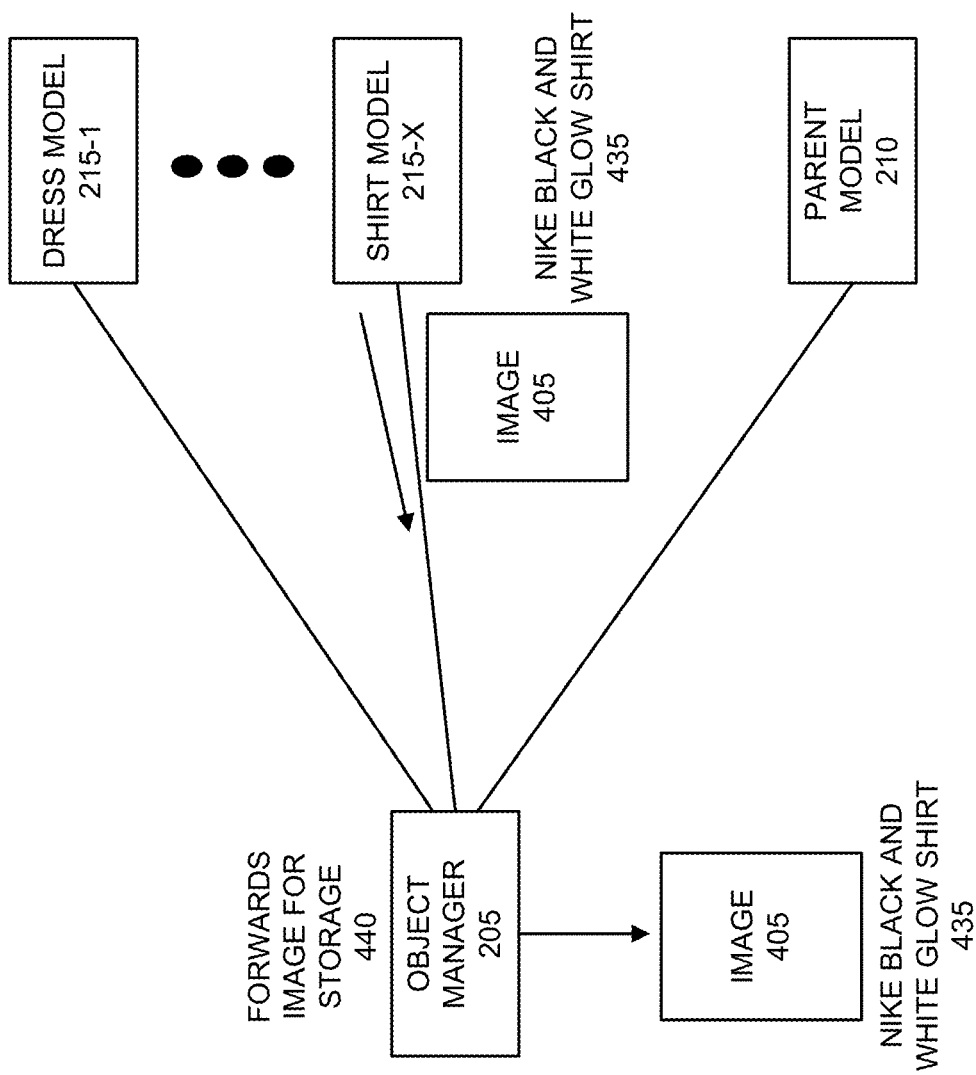

Referring to FIG. 4D, object manager 205 passes image 405 with the other data to shirt model 215-X. In response to receiving image 405 and the other data, shirt model 215-X analyzes image 405, and determines that an object in image 405 is a Nike black and white glow shirt 435. Referring to FIG. 4E, in response to this determination, shirt model 215-X passes image 405 back to object manager 205. The communication between shirt model 215-X and object manager 205 may include other data, such as the coordinates of the bounding box, metadata indicating that the object is a Nike black and white glow shirt, and a confidence score. Object manager 205 may forward the image for storage 440 to another network device that supports an end user service based on the object recognition service.

Although FIGS. 4A-4E illustrate an exemplary process of the service, according to other exemplary embodiments, the process may include additional, different, or fewer operations than those illustrated and described herein. For example, when multiple instances of a parent model or a particular child model are operating, object manager 205 may include logic that provides a load-balancing service. In this regard, object manager 205 may select an instance of a particular model based on load considerations, in addition to other considerations, as described herein.

Figure 5A:
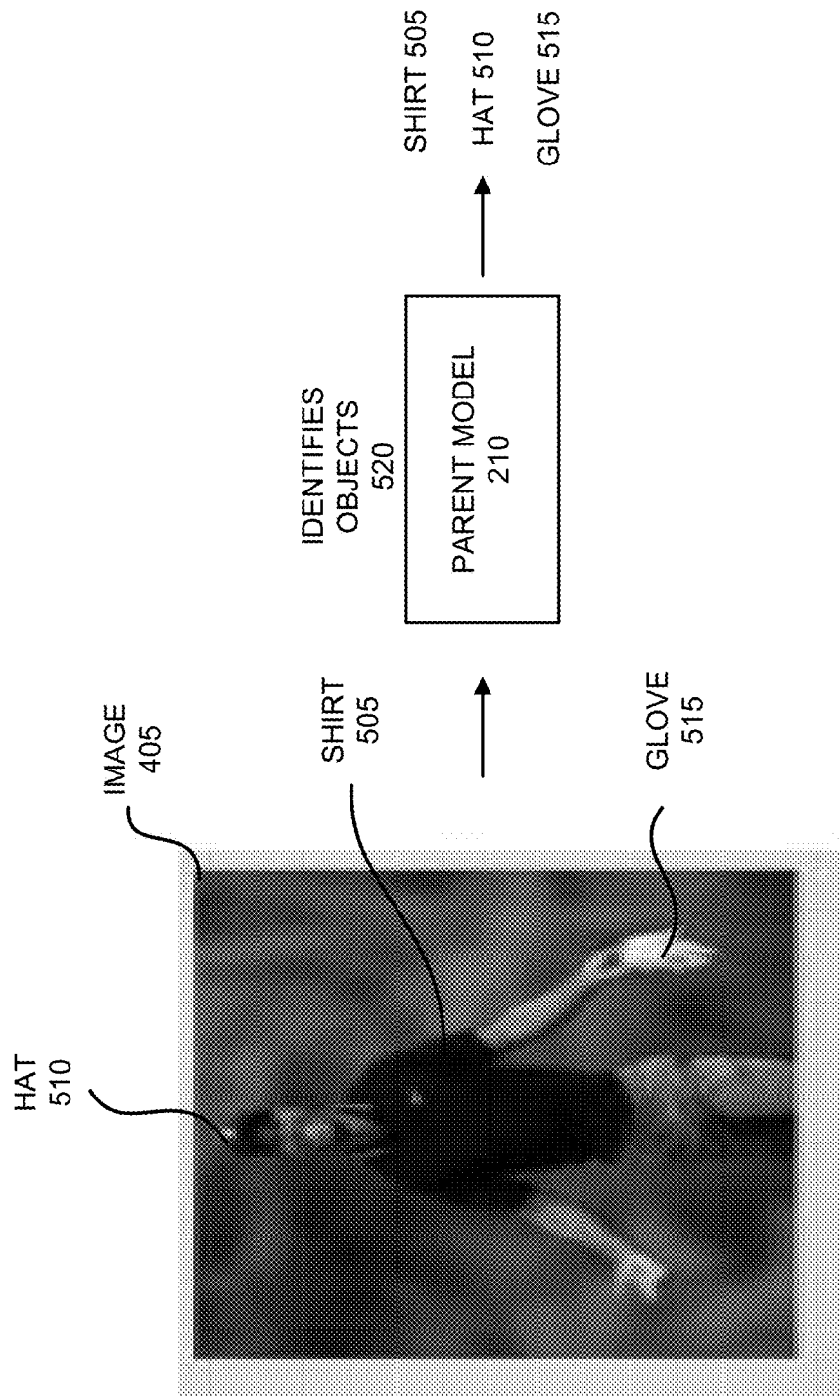
FIGS. 5A and 5B are diagrams illustrating another exemplary process of the objection recognition service.
Figure 5B:
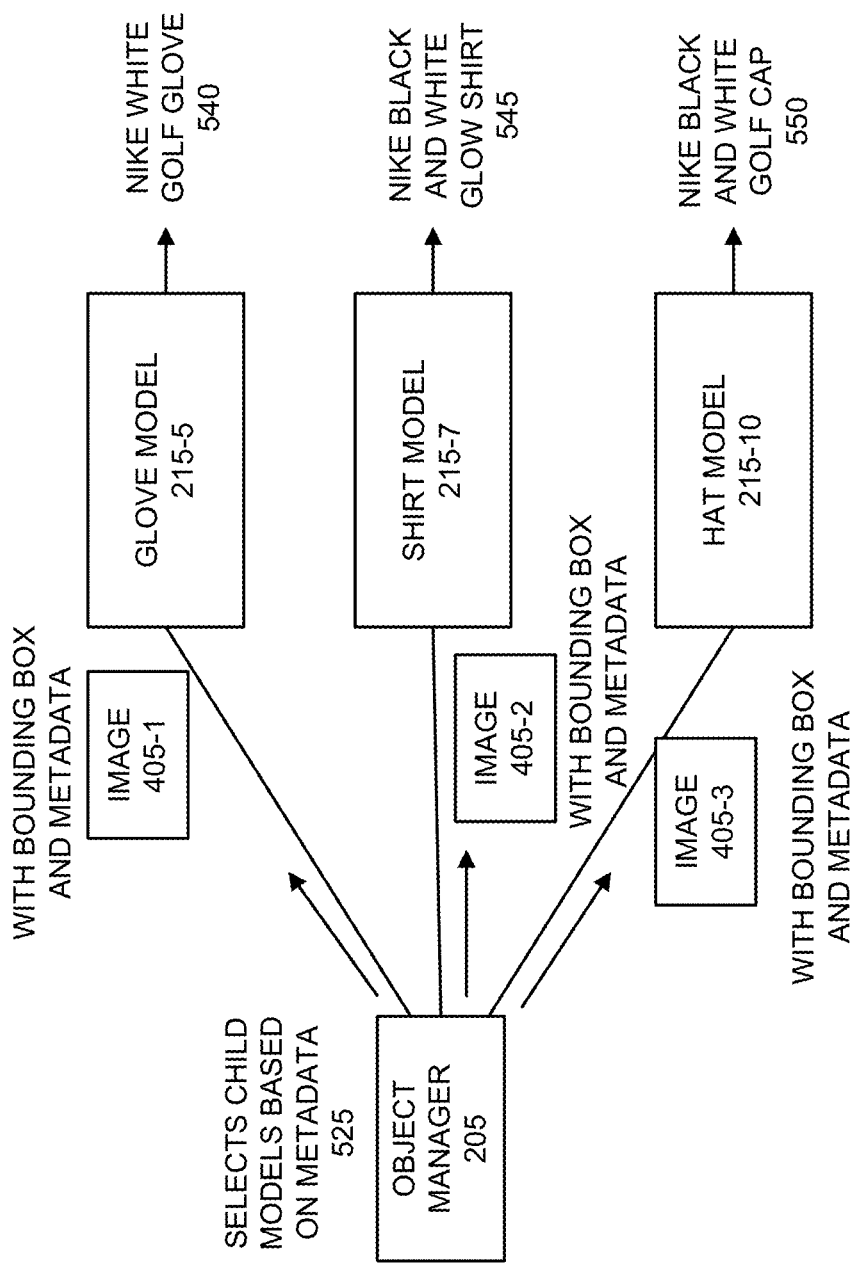

FIGS. 5A and 5B are diagrams illustrating yet another exemplary process of an exemplary embodiment of the service. As previously described, the service includes an object recognition service that is based on hierarchical domain-based inference models and can be used in a parallel manner. It may be assumed that parent model 210 and child models 215 have been trained. Referring to FIG. 5A, assume that parent model analyzes image 405, and identifies 520 multiple objects in image 405, such as a shirt 505, a hat 510, and a glove 515. Referring to FIG. 5B, subsequent to parent model 205 passing image 405 back to object manager 205, along with other data, such as the coordinates of the bounding boxes, metadata indicating that the objects are shirt 505, hat 510, and glove 515, and confidence scores, object manager 205 selects the appropriate child models 215 based on the metadata 525 so that further object recognition on the general category of each object can be performed. In this example, assume child models 215 include a glove model 215-5, a shirt model 215-7, and a hat model 215-10. Based on the data received from parent model 210, object manager 205 selects glove model 215-5 to further process image 405 and determine a sub-classification for glove 515, selects shirt model 215-7 to further process image 405 and determine a sub-classification for shirt 505, and selects hat model 215-10 to further process image 405 and determine a sub-classification for hat 510. Object manager 205 passes an image to each child model 215 along with the corresponding data pertaining to the object of interest for that child model 215. In this regard, glove model 215-5, shirt model 215-7, and hat model 215-10 may process the images 405-1, 405-2, and 405-3 in parallel. As a result of the sub-classification of objects, glove model 215-5 determines that image 405-1 includes a Nike white golf glove 540; shirt model 215-7 determines that image 405-2 includes a Nike black and white glow shirt 545; and hat model 215-10 determines that image 405-3 includes a Nike black and white golf cap 550. Although not illustrated, glove model 215-5, shirt model 215-7, and hat model 215-10 may pass images 405 back to object manager 205, along with other indicating data, for subsequent storage or use in support of an end user service, as previously described.

Although FIGS. 5A and 5B illustrate an exemplary process of the service, according to other exemplary embodiments, the process may include additional, different, or fewer operations than those illustrated and described herein. For example, when multiple instances of a parent model or a particular child model are operating, object manager 205 may include logic that provides a load-balancing service. In this regard, object manager 205 may select an instance of a particular model based on load considerations, in addition to other considerations, as described herein.

As previously described, the service may normalize the results received from different inference models. For example, the results may be normalized based on a sliding window analysis of the images and a threshold object detection value. A further description of a normalization service is described below.

Figure 6A:
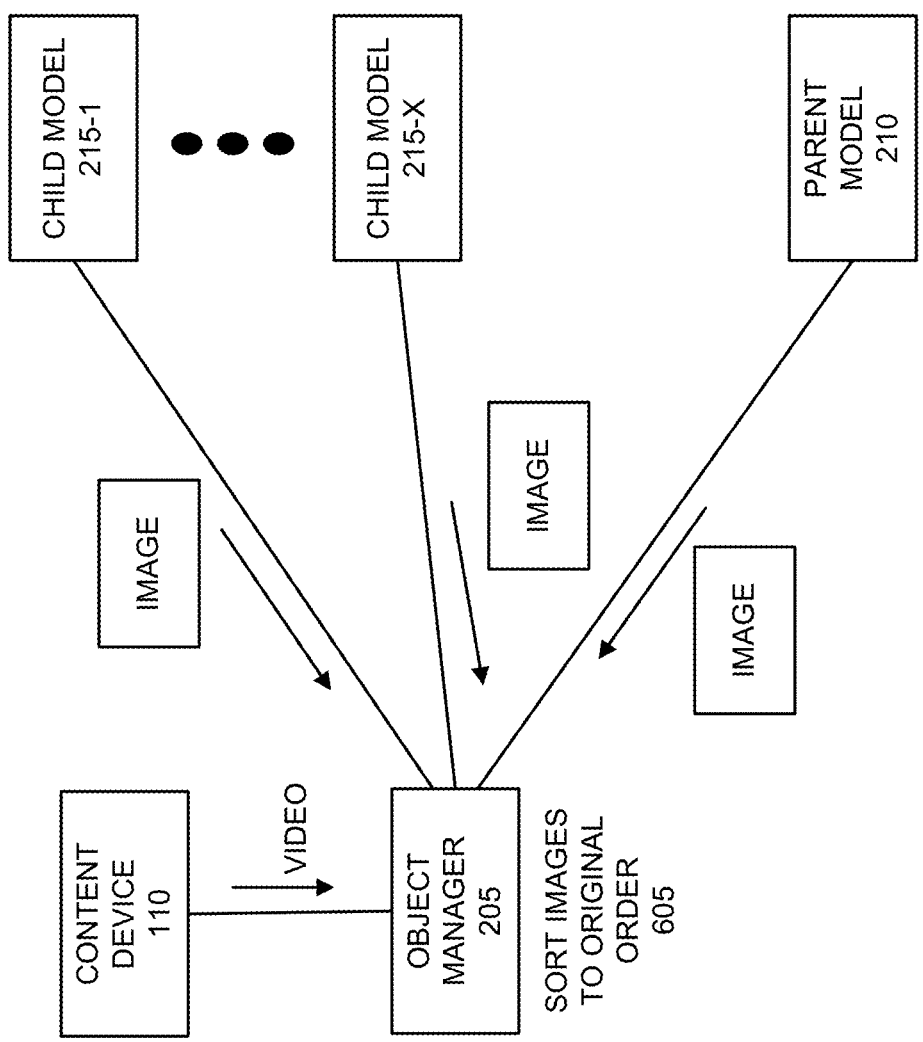
FIGS. 6A and 6B are diagrams illustrating an exemplary process of a normalization service.
Figure 6B:
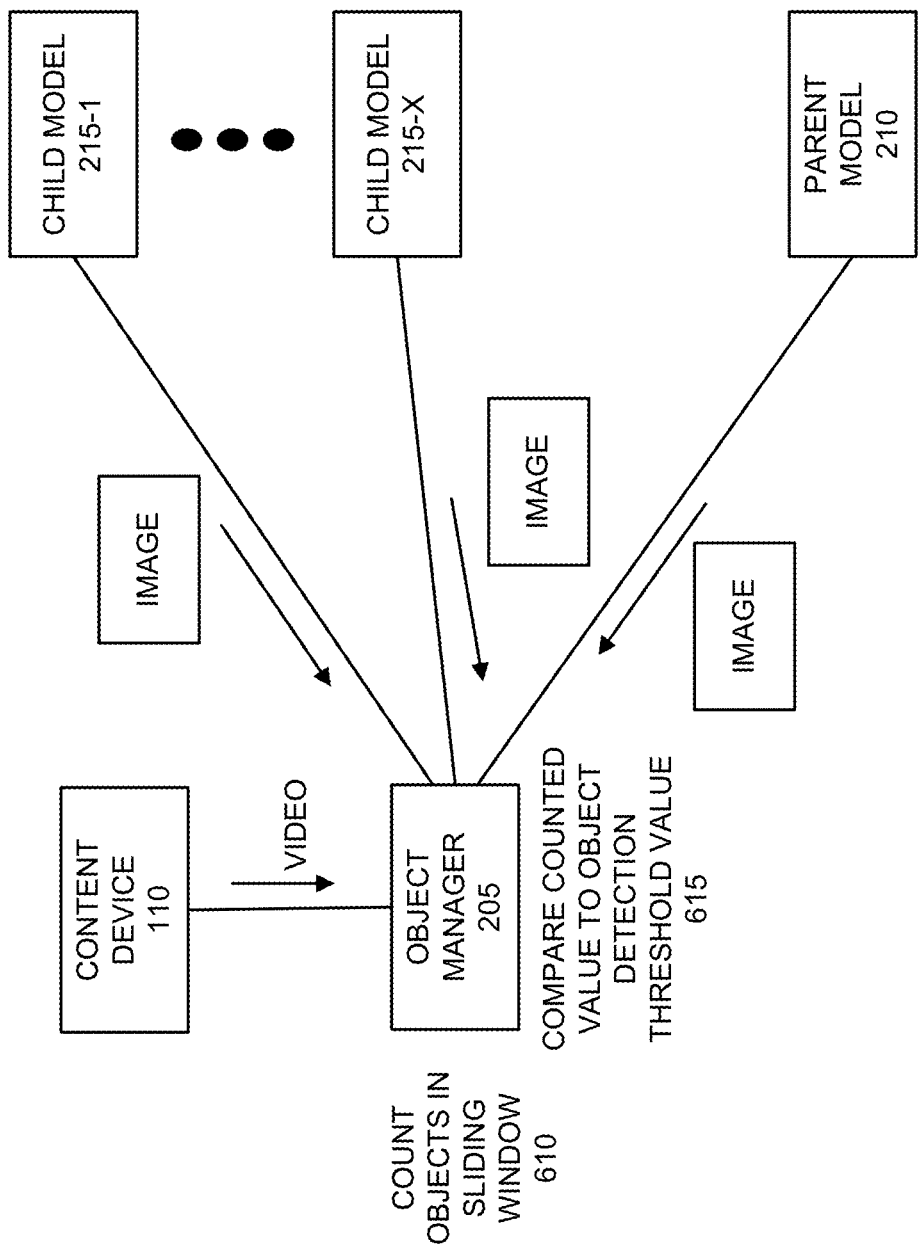

Referring to FIG. 6A, assume that object manager 205 receives a video from content device 110. The video may be received in a piecemeal approach (e.g., the video is streamed) or in its entirety (e.g., complete video is downloaded). In either case, as images of the video (e.g., video frames) are processed by parent model 210, and subsequently processed by child models 215, object manager 205 may receive these images out of order relative to the original order included in the video. Thus, object manager 205 includes logic to sort any out of order images back into their proper and original order 605. Referring to FIG. 6B, in response to the sorting of the images, object manager 205 may perform a sliding window analysis that detects false positive detection of objects and may eliminate the effect of anomalous or ambiguous bounding boxes. The sliding window may be defined by a fixed number of consecutive video frames and is user configurable. As an example, the sliding window may be 300 video frames or some other numerical value of consecutive video frames. Within each sliding window of video frames, object manager 205 includes logic that keeps track of the object(s) detected in each video frame and in each sliding window. For example, object manager 205 may count the number of times an object is detected. Object manager 205 may compare this value to an object detection threshold value. For example, if the object detection threshold value has a value of three (3), then object manager 205 would discard any objects that do not appear in the sliding window of video frames at least three times.

Upon completion of the analysis of the sliding window, object manager 205 moves the sliding window by one frame into the future, and reduces the count of all objects detected in the previous starting frame of the sliding window by one. Object manager 205 may continue the process, as previously described, until the end of the video is reached. That is, object manager 205 counts the objects in a sliding window 610, and the counted value of each object is compared to the object detection threshold value 615.

Although FIGS. 6A and 6B illustrate an exemplary process of the service, according to other exemplary embodiments, the process may include additional, different, or fewer operations than those illustrated and described herein.

FIG. 7 is a diagram illustrating exemplary components of a device 700 that may correspond to one or more of the devices described herein. For example, device 700 may correspond to components included in content device 110, object recognition system 115, and end device 120. As illustrated in FIG. 7, device 700 includes a bus 705, a processor 710, a memory/storage 715 that stores software 720, a communication interface 725, an input 730, and an output 735. According to other embodiments, device 700 may include fewer components, additional components, different components, and/or a different arrangement of components than those illustrated in FIG. 7 and described herein.

Bus 705 includes a path that permits communication among the components of device 700. For example, bus 705 may include a system bus, an address bus, a data bus, and/or a control bus. Bus 705 may also include bus drivers, bus arbiters, bus interfaces, clocks, and so forth.

Processor 710 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, graphics processing units (GPUs), and/or some other type of component that interprets and/or executes instructions and/or data. Processor 710 may be implemented as hardware (e.g., a microprocessor, etc.), a combination of hardware and software (e.g., a SoC, an ASIC, etc.), may include one or multiple memories (e.g., cache, etc.), etc.

Processor 710 may control the overall operation or a portion of operation(s) performed by device 700. Processor 710 may perform one or multiple operations based on an operating system and/or various applications or computer programs (e.g., software 720). Processor 710 may access instructions from memory/storage 715, from other components of device 700, and/or from a source external to device 700 (e.g., a network, another device, etc.). Processor 710 may perform an operation and/or a process based on various techniques including, for example, multithreading, parallel processing, pipelining, interleaving, etc.

Memory/storage 715 includes one or multiple memories and/or one or multiple other types of storage mediums. For example, memory/storage 715 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 715 may include a hard disk (e.g., a magnetic disk, an optical disk, a magneto-optic disk, a solid state disk, etc.) and a corresponding drive. Memory/storage 715 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 715 may include drives for reading from and writing to the storage medium.

Memory/storage 715 may be external to and/or removable from device 700, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 715 may store data, software, and/or instructions related to the operation of device 700.

Software 720 includes an application or a program that provides a function and/or a process. As an example, with reference to object recognition system 115, software 720 may include an application that, when executed by processor 710, provides the functions of services, as described herein. Software 720 may also include firmware, middleware, microcode, hardware description language (HDL), and/or other form of instruction. Software 720 may also include an operating system (OS) (e.g., Windows, Linux, etc.).

Communication interface 725 permits device 700 to communicate with other devices, networks, systems, and/or the like. Communication interface 725 includes one or multiple wireless interfaces and/or wired interfaces. For example, communication interface 725 may include one or multiple transmitters and receivers, or transceivers. Communication interface 725 may operate according to a protocol stack and a communication standard. Communication interface 725 may include an antenna. Communication interface 725 may include various processing logic or circuitry (e.g., multi-plexing/de-multiplexing, filtering, amplifying, converting, error correction, etc.).

Input 730 permits an input into device 700. For example, input 730 may include a keyboard, a mouse, a display, a touchscreen, a touchless screen, a button, a switch, an input port, speech recognition logic, and/or some other type of visual, auditory, tactile, etc., input component. Output 735 permits an output from device 700. For example, output 735 may include a speaker, a display, a touchscreen, a touchless screen, a light, an output port, and/or some other type of visual, auditory, tactile, etc., output component.

Device 700 may perform a process and/or a function, as described herein, in response to processor 710 executing software 720 stored by memory/storage 715. By way of example, instructions may be read into memory/storage 715 from another memory/storage 715 (not shown) or read from another device (not shown) via communication interface 725. The instructions stored by memory/storage 715 cause processor 710 to perform a process described herein. Alternatively, for example, according to other implementations, device 700 performs a process described herein based on the execution of hardware (processor 710, etc.).

Figure 8:
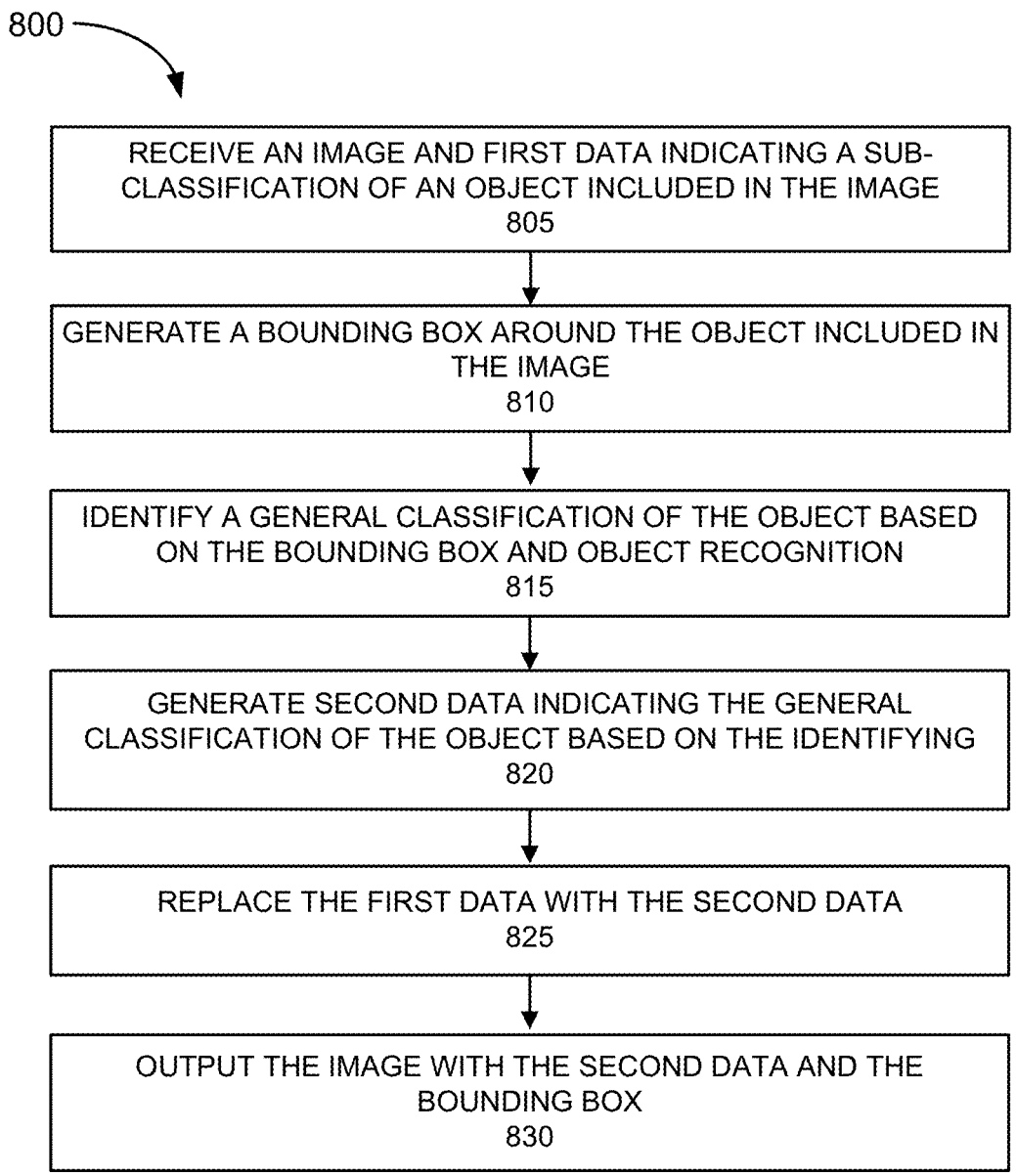
FIG. 8 is a flow diagram illustrating an exemplary process of an exemplary embodiment of the annotation service.

FIG. 8 is a flow diagram illustrating an exemplary process 800 of an exemplary embodiment of the annotation service. Process 800 is directed to a process previously described with respect to FIGS. 3A and 3B, as well as elsewhere in this description. According to an exemplary embodiment, object recognition system 115 performs the steps illustrated in FIG. 8. For example, processor 710 executes software 720 to perform the steps illustrated in FIG. 8, and described herein. By way of further example, parent model 210 may perform process 800.

Referring to FIG. 8, in block 805 of process 800, an image and first data, which indicates a sub-classification of an object included in the image, is received. For example, parent model 210 may receive an image that includes an object. Parent model 210 may also receive data indicating a sub-classification of the object. For example, the data may indicate a particular type of a general category of the object.

In block 810, a bounding box is generated around the object included in the image. For example, parent model 210 generates a bounding box around the object as a part of an object detection and classification process.

In block 815, a general classification of the object is identified based on the bounding box and object recognition. For example, parent model 210 performs object recognition within the bounding box. Parent model 210 identifies a general category of the object.

In block 820, second data that indicates the general classification of the object is generated based on the identification of the object. For example, parent model 210 generates data that indicates the general category of the object (e.g., shirt, dress, etc.).

In block 825, the first data is replaced with the second data. For example, parent model 210 replaces the data indicating the general category of the object with the data indicating the sub-classification of the general category of the object.

In block 830, the image, the second data, and the bounding box are output. For example, parent model 210 outputs the image, the second data, and the bounding box. As previously described, the image, the second data, and the bounding box may be used as training data for child model 215.

Although FIG. 8 illustrates an exemplary process 800 of a service, according to other embodiments, process 800 may include additional operations, fewer operations, and/or different operations than those illustrated in FIG. 8, and described herein.

Figure 9:
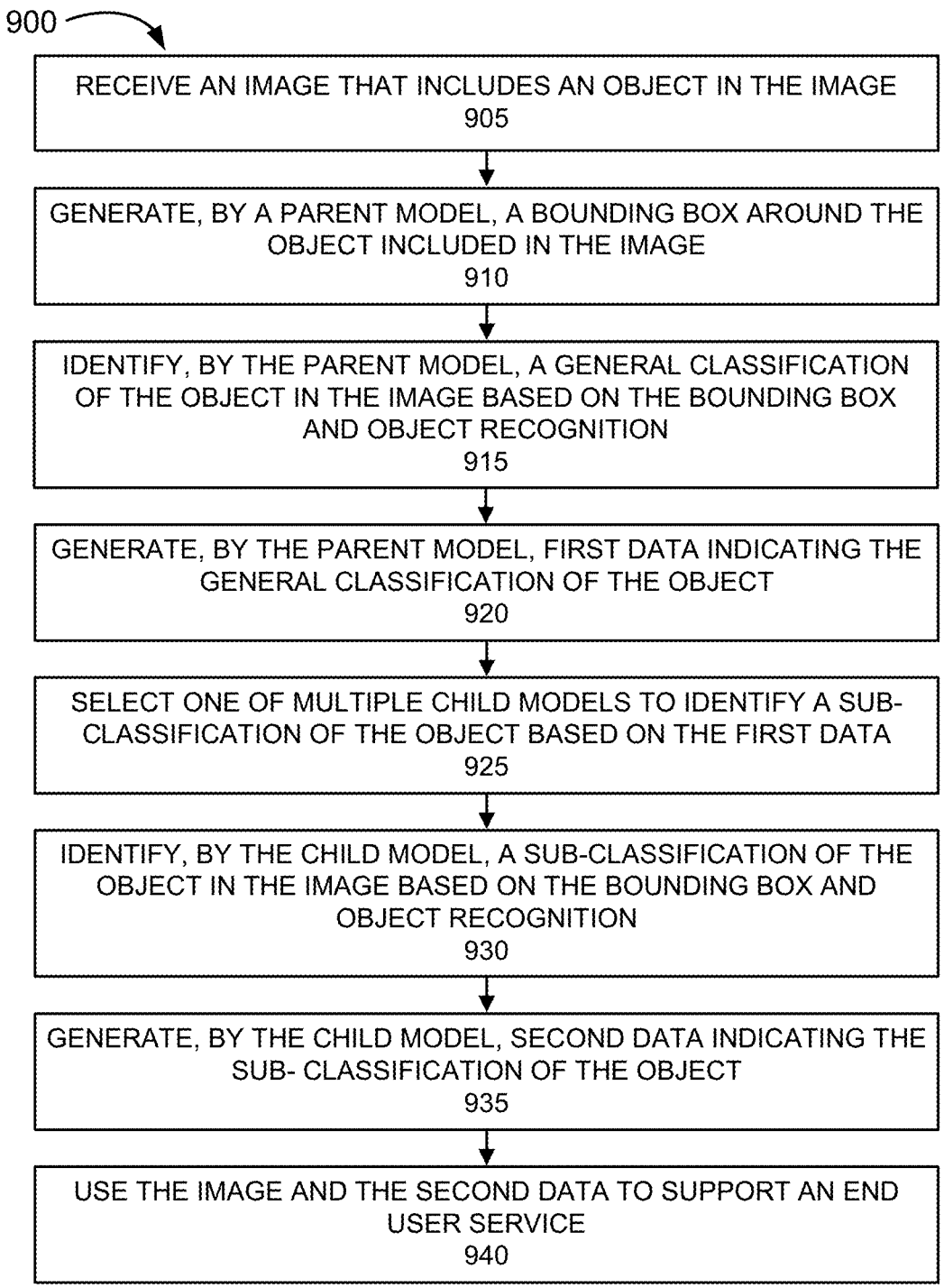
FIG. 9 is a flow diagram illustrating an exemplary process of an exemplary embodiment of an objection recognition service.

FIG. 9 is a flow diagram illustrating an exemplary process 900 of an exemplary embodiment of the object recognition service. Process 900 is directed to a process previously described with respect to FIGS. 4A-4E, as well as elsewhere in this description. According to an exemplary embodiment, object recognition system 115 performs the steps illustrated in FIG. 9. For example, processor 710 executes software 720 to perform the steps illustrated in FIG. 9, and described herein.

Referring to FIG. 9, in block 905 of process 900, an image that includes an object is received. For example, object manager 205 of objection recognition system 115 may receive the image from content device 110. The image may be a part of a video. Additionally, for example, the video may be a program (e.g., a television show, etc.) associated with a television service provided to end device 120. In response to receiving the image, object manager 205 may select a parent model 210 that is able to classify an object included in the image. Depending on the number of parent models available, object manager 205 may select the parent model 210 based on load balancing considerations. Additionally, for example, object manager 205 may select the parent model 210 based on the type of video program and/or a television channel that is associated with the video program. As an example, object recognition system 115 may include some parent models 210 that detect non-sports clothing or fashion items, and other parent models 210 that detect sports clothing or sports items. Based on the metadata associated with the program, object manager 205 may determine a general category (e.g., sports versus non-sports) of potential objects included in the video.

In block 910, a bounding box is generated around the object included in the image. For example, the selected parent model 210 receives the image from object manager 205. In response to receiving the image, parent model 210 performs an object detection process that includes generating a bounding box around the object.

In block 915, a general classification of the object is identified based on the bounding box and object recognition. For example, parent model 210 performs an object classification process within the bounding box. Parent model 210 identifies a general category of the object.

In block 920, first data, which indicates the general classification of the object, is generated. For example, parent model 210 may generate first data that indicates the general classification of the object (e.g., a shirt). Parent model 210 may return the image along with other data to object manager 205. For example, the other data may include the bounding box, a confidence score, and the first data indicating the classification of the object.

In block 925, one of multiple child models are selected to identify a sub-classification of the object based on the first data. For example, object manager 205 may select a child model 215 from among multiple child models 215 based on the classification of the object. By way of further example, as previously described, the parent model 210 and child models 215 may form a hierarchical domain-based inference model architecture, in which a child model 215 may provide an object recognition service directed to a sub-classification of an object relative to the classification of the object provided by parent model 210. In this way, based on the classification of the object, object manager 205 selects a child model 215 that is able to detect and sub-classify the object in correspondence to the classification. Depending on the number of child models 215 configured for the desired sub-classification, object manager 205 may select the child model 215 based on load balancing considerations. Object manager 205 provides the image, and may provide the other data to the selected child model 215.

In block 930, a sub-classification of the object is identified based on the bounding box and object recognition. For example, child model 215 performs an object classification process within the bounding box. Child model 215 identifies a sub-category of the object.

In block 935, second data, which indicates the sub-classification of the object, is generated. For example, child model 215 may generate the second data that indicates the sub-classification of the object (e.g., a Ralph Lauren red, white, and blue polo shirt for men). Child model 215 may return the image along with other data to object manager 205. For example, the other data may include a confidence score, and the second data indicating the sub-classification of the object.

In block 940, the image and the second data may be used to support an end user service. For example, object manager 205 may make available the object classification data to an end user service. By way of further example, the object classification data may support various interactive services that may be available to a user while watching the video, such as a shopping service, an inquiry service to obtain additional information about an item, etc. In this regard, object recognition system 115 may support real-time end user services, based on the hierarchical domain-based inference model framework, such that the object detection and classification may be performed concurrently with the delivery of the content to users of end devices 120. Alternatively, object recognition system 115 may provide the service before the delivery of the content to users.

Although FIG. 9 illustrates an exemplary process 900 of a service, according to other embodiments, process 900 may include additional operations, fewer operations, and/or different operations than those illustrated in FIG. 9, and described herein. For example, object manager 205 may perform the normalization service, as previously described.

Figure 10:
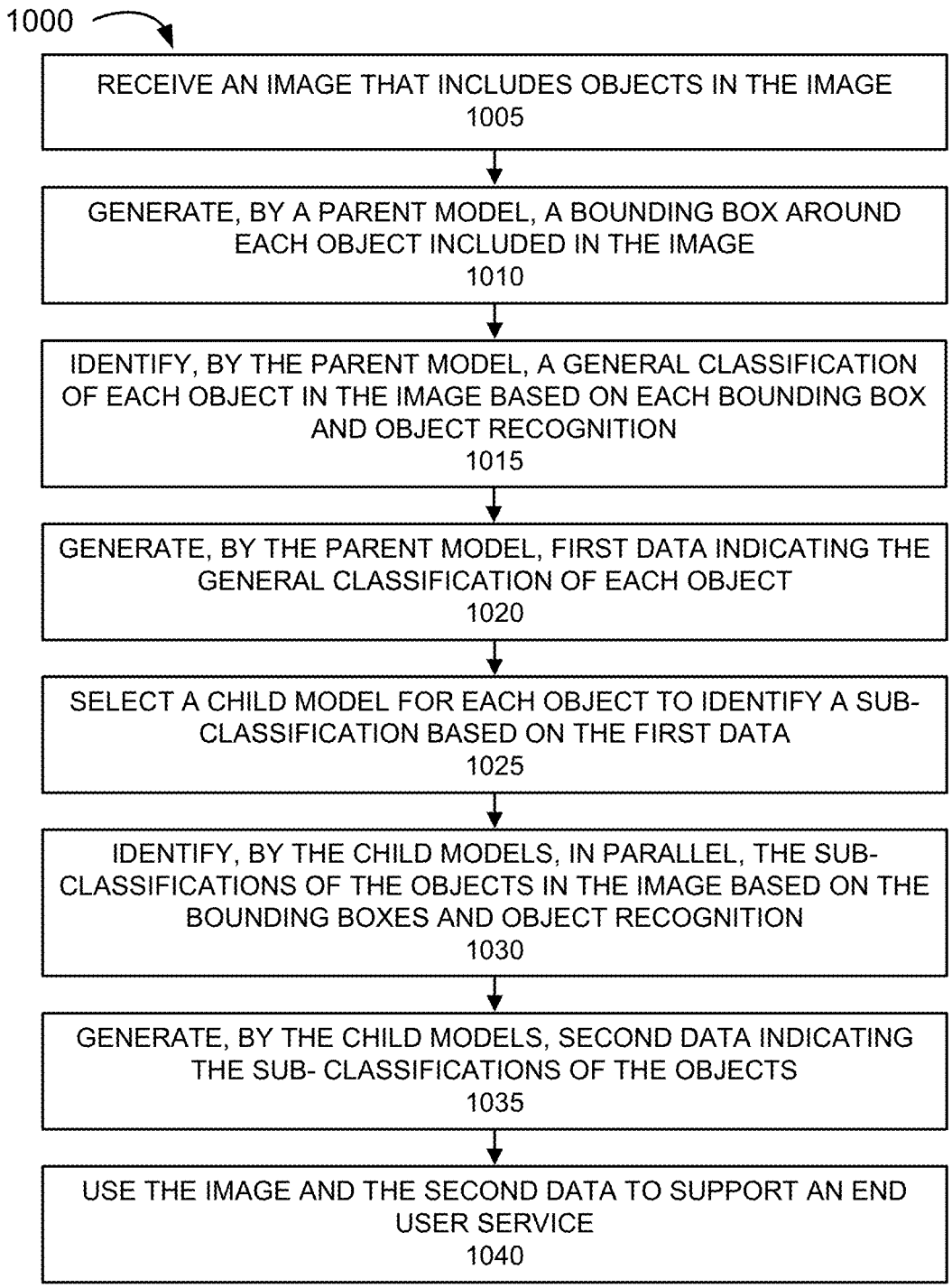
FIG. 10 is a flow diagram illustrating another exemplary process of an exemplary embodiment of the object recognition service.

FIG. 10 is a flow diagram illustrating an exemplary process 1000 of an exemplary embodiment of the object recognition service. Process 1000 is directed to a process previously described with respect to FIGS. 5A and 5B, as well as elsewhere in this description. According to an exemplary embodiment, object recognition system 115 performs the steps illustrated in FIG. 10. For example, processor 710 executes software 720 to perform the steps illustrated in FIG. 10, and described herein.

Referring to FIG. 10, in block 1005 of process 1000, an image that includes objects is received. For example, object manager 205 of objection recognition system 115 may receive the image from content device 110. The image may be a part of a video. Additionally, for example, the video may be a program (e.g., a television show, etc.) associated with a television service provided to end device 120. In response to receiving the image, object manager 205 may select a parent model 210 that is able to classify the objects included in the image. Depending on the number of parent models available, object manager 205 may select the parent model 210 based on load balancing considerations. Additionally, for example, object manager 205 may select the parent model 210 based on the type of video program and/or a television channel that is associated with the video program. As an example, object recognition system 115 may include some parent models 210 that detect non-sports clothing or fashion items, and other parent models 210 that detect sports clothing or sports items. Based on the metadata associated with the program, object manager 205 may determine a general category (e.g., sports versus non-sports) of potential objects included in the video.

In block 1010, a bounding box is generated around each object included in the image. For example, the selected parent model 210 receives the image from object manager 205. In response to receiving the image, parent model 210 performs an object detection process that includes generating a bounding box around each object.

In block 1015, a general classification of each object is identified based on the bounding box and object recognition. For example, parent model 210 performs an object classification process within each bounding box. Parent model 210 identifies a general category of each object. For example, parent model 210 may identify a dress and a bag.

In block 1020, first data, which indicates the general classification of each object, is generated. For example, parent model 210 may generate first data that indicates the general classification of the object (e.g., the dress, the bag). Parent model 210 may return the image along with other data to object manager 205. For example, the other data may include the bounding box, a confidence score, and the first data indicating the classification of each object.

In block 1025, a child model is selected to identify a sub-classification of each object based on the first data. For example, object manager 205 may select multiple child models 215 based on the classification of each object. By way of further example, as previously described, based on the classification of the object, object manager 205 selects a child model 215 that is able to detect and sub-classify the object in correspondence to the classification. Depending on the number of child models 215 configured for the desired sub-classification, object manager 205 may select the child model 215 based on load balancing considerations. Object manager 205 provides the image, and may provide the other data to the selected child models 215. As previously described, for example, the submission of the images to child models 215 may be performed as a parallel process.

In block 1030, sub-classifications of the objects are identified based on the bounding boxes and object recognition. For example, each child model 215 performs an object classification process within the bounding box. Each child model 215 identifies a sub-category of one of the objects. For example, one child model 215 may identify a sub-category for a dress while another child model 215 may identify a sub-category for a bag.

In block 1035, second data, which indicate the sub-classifications of the objects, is generated. For example, each child model 215 may generate the second data that indicates the sub-classification of the object. For example, one child model 215 may identify the sub-category of the dress as a Versace Asymmetric metal push dress, and the other child model 215 may identify the sub-category of the dress as a Gucci Sylvie leather maxi top handle bag. Each child model 215 may return the image along with other data to object manager 205. For example, the other data may include a confidence score, and the second data indicating the sub-classification of the object.

In block 1040, the image and the second data may be used to support an end user service. For example, object manager 205 may make available the object classification data to an end user service. By way of further example, the object classification data may support various interactive services that may be available to a user while watching the video, such as a shopping service, an inquiry service to obtain additional information about an item, etc. In this regard, object recognition system 115 may support real-time end user services, based on the hierarchical domain-based inference model framework, such that the object detection and classification may be performed concurrently with the delivery of the content to users of end devices 120. Alternatively, object recognition system 115 may provide the service before the delivery of the content to users.

Although FIG. 10 illustrates an exemplary process 1000 of a service, according to other embodiments, process 1000 may include additional operations, fewer operations, and/or different operations than those illustrated in FIG. 10, and described herein. For example, object manager 205 may perform the normalization service, as previously described.

Figure 11A:
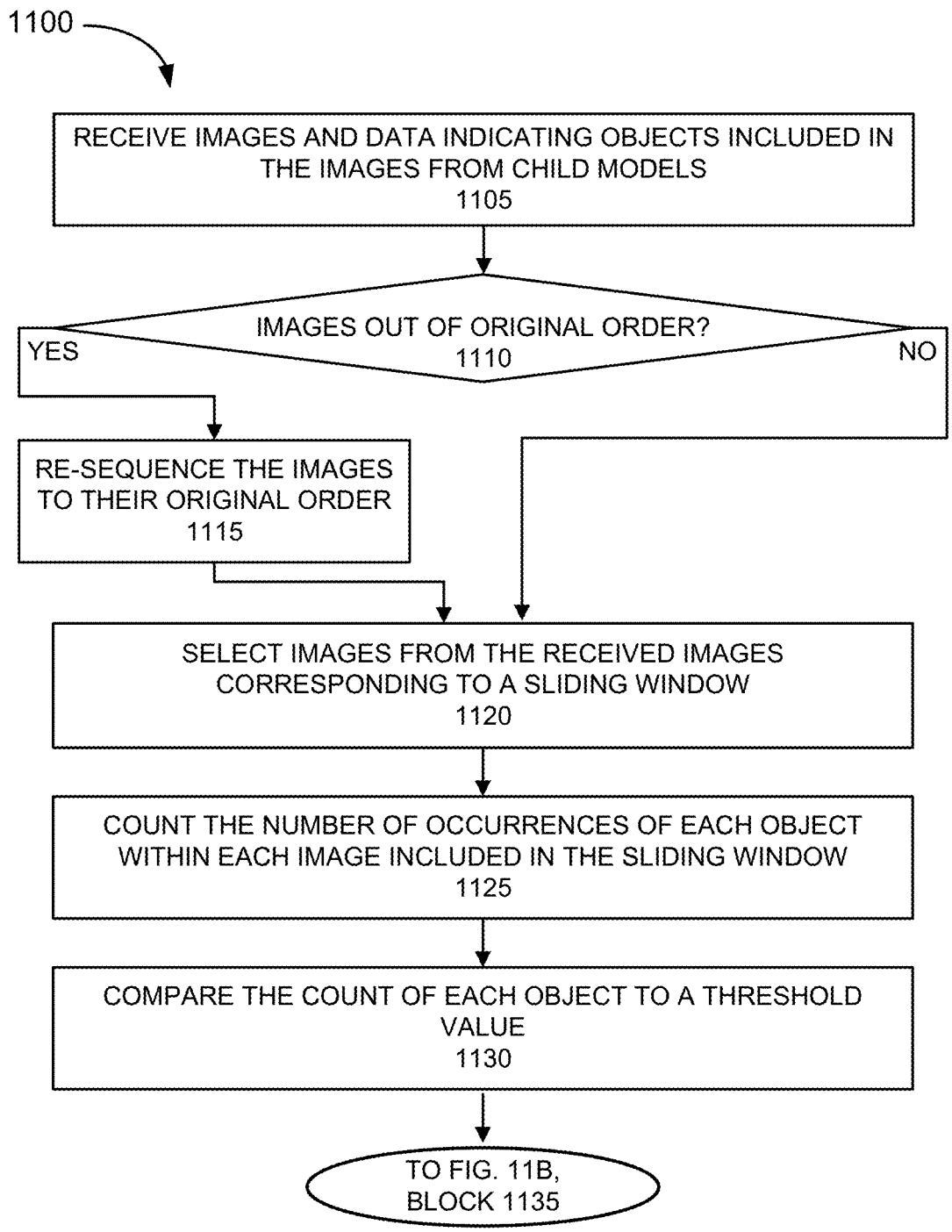
FIGS. 11A and 11B are flow diagrams illustrating an exemplary process of an exemplary embodiment of the normalization service.
Figure 11B:
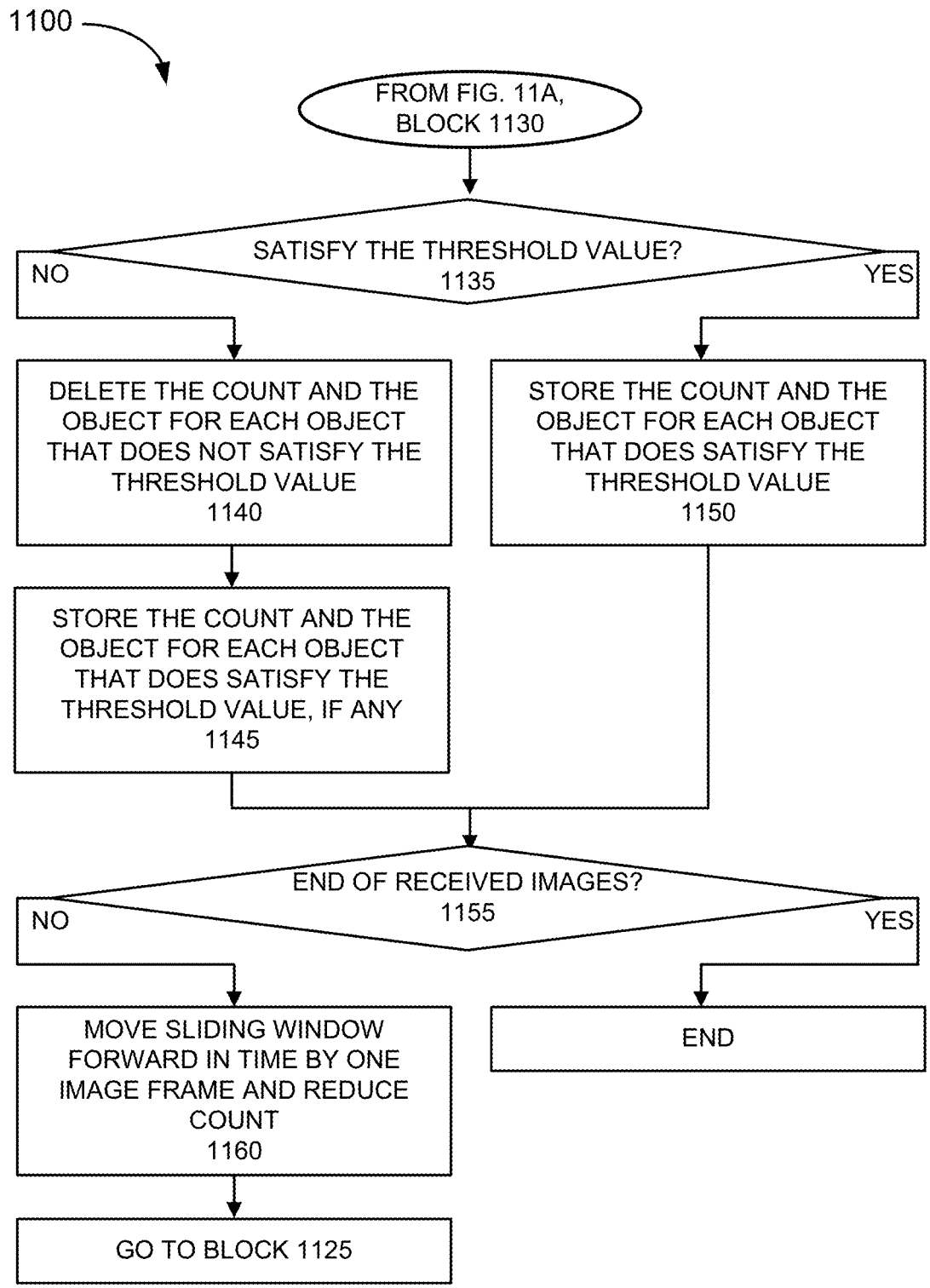

FIGS. 11A and 11B are flow diagrams illustrating an exemplary process 1100 of an exemplary embodiment of the normalization. Process 1100 is directed to a process previously described with respect to FIGS. 6A and 6B, as well as elsewhere in this description. According to an exemplary embodiment, object recognition system 115 performs the steps illustrated in FIG. 11. For example, processor 710 executes software 720 to perform the steps illustrated in FIG. 11, and described herein.

Referring to FIG. 11A, in block 1105, images and data indicating objects included in the images are received from child models. For example, object manager 205 may receive images and data indicating the objects included in the images from child models 215.

In block 1110, it is determined whether the images are out of order. For example, object manager 205 may compare the order of the images as the images are received from child models 215 and/or stored by object manager 205 subsequent to their receipt, with an original order of the images. For example, object manager 205 may identify the order of the images, as originally received from content device 110.

When it is determined that the images are out of order (block 1110—YES), the images are re-sequenced according to their original order (block 1115). For example, object manager 205 may re-sequence the order of the images according to a video sequence or other original sequence. When it is determined that the images are not out of order (block 1110—NO), process 1100 may continue to block 1120.

In block 1120, images are selected from the received images that correspond to a sliding window. For example, object manager 205 may select a certain number of sequential images based on a sliding window value.

In block 1125, the number of occurrences of each object within each image included in the sliding window is counted. For example, object manager 205 may count the number of objects in each image and correlate each count with the object. By way of further example, object manager 205 may count the number of instances of a particular dress within the images of the sliding window.

In block 1130, the count of each object is compared to a threshold value. For example, object manager 205 may store a threshold value that indicates a minimum frequency or count of the object appearing in the sliding window.

Referring to FIG. 11B, in block 1135, it is determined whether the count of each object satisfies the threshold value based on the comparison. For example, for each object, object manager 205 may determine whether the count of the object is equal to or greater than the threshold value.

When it is determined that one or multiple counts of objects do not satisfy the threshold value (block 1135—NO), the count and the object for each object that does not satisfy the threshold value is deleted (block 1140). For example, object manager 205 may determine that one or multiple counts of objects are below the threshold value. In response, object manager 205 may delete the data indicating the presence of the object in the images of the sliding window.

In block 1145, the count and the object for each object that does satisfy the threshold value, if any, is stored. For example, object manager 205 may determine that one or multiple counts of remaining objects are equal to or above the threshold value. In response, object manager 205 may store the data indicating the count and the type of object occurring in the images.

Referring back to block 1135, when it is determined that the count of all of the objects satisfies the threshold value (block 1135—YES), the count and the object for each object that does satisfy the threshold value is stored. For example, object manager 205 may determine that all counts of objects in the images of the sliding window are equal to or above the threshold value. Object manager 205 may store the data indicating the count and the type of object occurring in the images.

In block 1155, it is determined whether all of the received images have been normalized. For example, object manager 205 may determine whether all the images have been normalized. By way of further example, object manager 205 may determine whether a last video frame of the video was included in the current sliding window. When it is determined that all of the received images have been normalized (block 1155—YES), process 1100 may end.

When it is determined that all of the received images have not been normalized (block 1155—NO), the sliding window may be moved forward by one image frame, and the count and object pertaining to the starting image frame of the previous sliding window is deducted (block 1160). For example, object manager 205 may reduced the count of all objects detected in the starting image frame of the previous sliding window. Process 1100 returns to block 1125.

Although FIGS. 11A and 11B illustrate an exemplary process 1100 of a service, according to other embodiments, process 1100 may include additional operations, fewer operations, and/or different operations than those illustrated in FIGS. 11A and 11B, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. For example, although the service, as described, may be used in an object recognition context, such a context is illustrative. For example, the service may be used in machine learning applications other than object recognition, such as sentiment analysis. For example, general categories of human emotion (e.g., angry, happy, etc.) may be further sub-classified (e.g., passive anger, volatile anger, ecstasy, delight, etc.). Additionally, although the foregoing description may suggest a two-tier hierarchy, the hierarchical domain-based inference models, as described herein, may be implemented by two or more tiers of hierarchy.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 8-10, 11A, and 11B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (e.g., processor 710, etc.), or a combination of hardware and software (e.g., software 720). The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 710) of a computational device. A non-transitory storage medium includes one or more of the storage mediums described in relation to memory/storage 715.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
  receiving, by a parent inference model of a network device, data indicating a sub-classification of a sample object and a sample image that includes the sample object, wherein the network device further includes a child inference model, and the parent inference model and the child inference model each performs object recognition;

generating, by the parent inference model, a bounding box that indicates a region of interest with respect to the sample object;

identifying, by the parent inference model, a first general classification of the sample object included in the sample image;

generating, by the parent inference model, sample data indicating the first general classification of the sample object;

replacing the sample data with the data indicating the sub-classification; and training the child inference model using the sample image, the bounding box, and the data indicating the sub-classification.

2. The method of claim 1, further comprising:

receiving, by the network after the using, a first image designated for object recognition; and selecting, by the network device, the parent inference model to perform object recognition of the first image based on a television channel from which the first image originates.

3. The method of claim 2, further comprising:

identifying, by the parent inference model, a first general classification of an object included in the first image; and generating, by the parent inference model, first data indicating the first general classification of the object.

4. The method of claim 3, further comprising:

selecting, by the network device, the child inference model based on the first data, wherein the child inference model has a hierarchical relationship with the parent inference model;

identifying, by the child inference model, a first sub-classification of the first general classification of the object;

generating, by the child inference model, second data indicating the first sub-classification of the object; and using the first image and the second data in an end user service.

5. The method of claim 4, wherein the end user service includes a shopping service and the object is a candidate item for purchase.

6. The method of claim 4, further comprising:

receiving, by the network device, second images after receiving the first image;

identifying, by the parent inference model, second general classifications of objects included in the second images;

generating, by the parent inference model, third data indicating the second general classifications of the objects; and selecting, by the network device, one or more other child inference models based on the third data.

7. The method of claim 6, further comprising:

identifying, by the one or more other ones of the child inference models, second sub-classifications of the second general classifications of the objects; and generating, by the one or more other ones of the child inference models, fourth data indicating the second sub-classifications of the objects.

8. The method of claim 1, further comprising:

resizing, by the network device after the replacing, the bounding box based on an input requirement of the child inference model.

9. A network device comprising:

a parent inference model;

a child inference model, wherein the parent inference model and the child inference model each performs object recognition; and a processor that is configured to:

receive, by the parent inference model, data indicating a sub-classification of a sample object and a sample image that includes the sample object;

generate, by the parent inference model, a bounding box that indicates a region of interest with respect to the sample object;

identify, by the parent inference model, a first general classification of the sample object included in the sample image;

generate, by the parent inference model, sample data indicating the first general classification of the sample object;

replace the sample data with the data indicating the sub-classification; and train the child inference model using the sample image, the bounding box, and the data indicating the sub-classification.

10. The network device of claim 9, wherein the processor is further configured to:

receive, after the using, a first image designated for object recognition; and select the parent inference model to perform object recognition of the first image based on a television channel from which the first image originates.

11. The network device of claim 10, wherein the processor is further configured to:

identify, by the parent inference model, a first general classification of an object included in the first image; and generate, by the parent inference model, first data indicating the first general classification of the object.

12. The network device of claim 11, wherein the processor is further configured to:

select the child inference model based on the first data, wherein the child inference model has a hierarchical relationship with the parent inference model;

identify, by the child inference model, a first sub-classification of the first general classification of the object;

generate, by the child inference model, second data indicating the first sub-classification of the object; and use the first image and the second data in an end user service.

13. The network device of claim 12, wherein the end user service includes a shopping service and the object is a candidate item for purchase.

14. The network device of claim 12, wherein the processor is further configured to:

receive second images after receiving the first image;

identify, by the parent inference model, second general classifications of objects included in the second images;

generate, by the parent inference model, third data indicating the second general classifications of the objects; and select one or more other child inference models based on the third data.

15. The network device of claim 9, wherein the processor is further configured to:
resize, after the replacement, the bounding box based on an input requirement of the child inference model.

16. A non-transitory computer-readable storage medium storing instructions executable by a processor of a device comprising a parent inference model and a child inference model that each performs object recognition, which when executed cause the device to:
receive, by the parent inference model, data indicating a sub-classification of a sample object and a sample image that includes the sample object;
generate, by the parent inference model, a bounding box that indicates a region of interest with respect to the sample object;
identify, by the parent inference model, a first general classification of the sample object included in the sample image;
generate, by the parent inference model, sample data indicating the first general classification of the sample object;
replace the sample data with the data indicating the sub-classification; and
train the child inference model using the sample image, the bounding box, and the data indicating the sub-classification.

17. The non-transitory computer-readable storage medium of claim 16, wherein the instructions further include instructions executable by the processor of the device, which when executed cause the device to:
receive, after the using, a first image designated for object recognition; and
select the parent inference model to perform object recognition of the first image based on a television channel from which the first image originates.

18. The non-transitory computer-readable storage medium of claim 17, wherein the instructions further include instructions executable by the processor of the device, which when executed cause the device to:
identify, by the parent inference model, a first general classification of an object included in the first image; and
generate, by the parent inference model, first data indicating the first general classification of the object.

19. The non-transitory computer-readable storage medium of claim 18, wherein the instructions further include instructions executable by the processor of the device, which when executed cause the device to:
select the child inference model based on the first data, wherein the child inference model has a hierarchical relationship with the parent inference model;
identify, by the child inference model, a first sub-classification of the first general classification of the object;
generate, by the child inference model, second data indicating the first sub-classification of the object; and
use the first image and the second data in an end user service that includes a shopping service and the object is a candidate item for purchase.

20. The non-transitory computer-readable storage medium of claim 16, wherein the instructions further include instructions executable by the processor of the device, which when executed cause the device to:
resize, after the replacement, the bounding box based on an input requirement of the child inference model.

* * * * *